United States Patent
Tame

[19]

[11] Patent Number: 5,927,809
[45] Date of Patent: Jul. 27, 1999

[54] EASY ENTRY SEAT WITH SEAT BACK LOCKOUT UNTIL FULL RETURN

[75] Inventor: Omar D. Tame, W. Bloomfield, Mich.

[73] Assignee: Atoma International, Inc., Markham, Ontario, Canada

[21] Appl. No.: 09/152,675

[22] Filed: Sep. 14, 1998

Related U.S. Application Data

[63] Continuation of application No. 08/760,875, Dec. 9, 1996, abandoned.

[51] Int. Cl.$^6$ ............................................ B60N 2/02
[52] U.S. Cl. ............... 297/341; 297/344.11; 297/378.12
[58] Field of Search ................. 297/341, 344.1, 297/344.11, 378.1, 378.12, 378.14; 248/429, 430

[56] References Cited

U.S. PATENT DOCUMENTS

| | | |
|---|---|---|
| 4,607,884 | 8/1986 | Heling . |
| 4,652,052 | 3/1987 | Hessler . |
| 4,856,847 | 8/1989 | Kanai . |
| 4,881,774 | 11/1989 | Bradley . |
| 5,597,206 | 1/1997 | Aimsworth et al. ................. 297/341 X |
| 5,626,392 | 5/1997 | Bawer et al. ............................ 297/341 |
| 5,695,247 | 12/1997 | Premji ..................................... 297/341 |

FOREIGN PATENT DOCUMENTS

| | | |
|---|---|---|
| 135 596 | 4/1985 | European Pat. Off. . |
| 0 537 057 | 4/1993 | France . |
| 35 17 877 | 11/1985 | Germany . |
| 44 19 335 | 12/1995 | Germany . |

OTHER PUBLICATIONS

Patent Abstracts of Japan, Inventor: Hisao, Walk–In Device of Car Seat, Publication No. 57158127, dated Sep. 29, 1982.

*Primary Examiner*—Laurie K. Cranmer
*Attorney, Agent, or Firm*—Pillsbury Madison & Sutro LLP

[57] ABSTRACT

A vehicle seat movable through a cycle of access movement which includes (1) forward movement of the seat back cushion assembly into a seat back access position and forward movement of the seat and seat back cushion assemblies together from a seat operating position into said seat access position and (2) rearward movements of the seat and seat back assemblies together from the seat access position into a seat operating position and the seat back cushion assembly into a seat back operating position. A blocking mechanism is provided operative associated with a motion transmitting assembly for the seat operable during a cycle of access movement to prevent the seat back cushion assembly from reaching a seat back operating position during the rearward movement of the seat back cushion assembly from the seat back access position in the event the aforesaid rearward movement of the seat back cushion assembly precedes the rearward movement of the seat and seat back cushion assemblies together into a seat operating position.

29 Claims, 15 Drawing Sheets

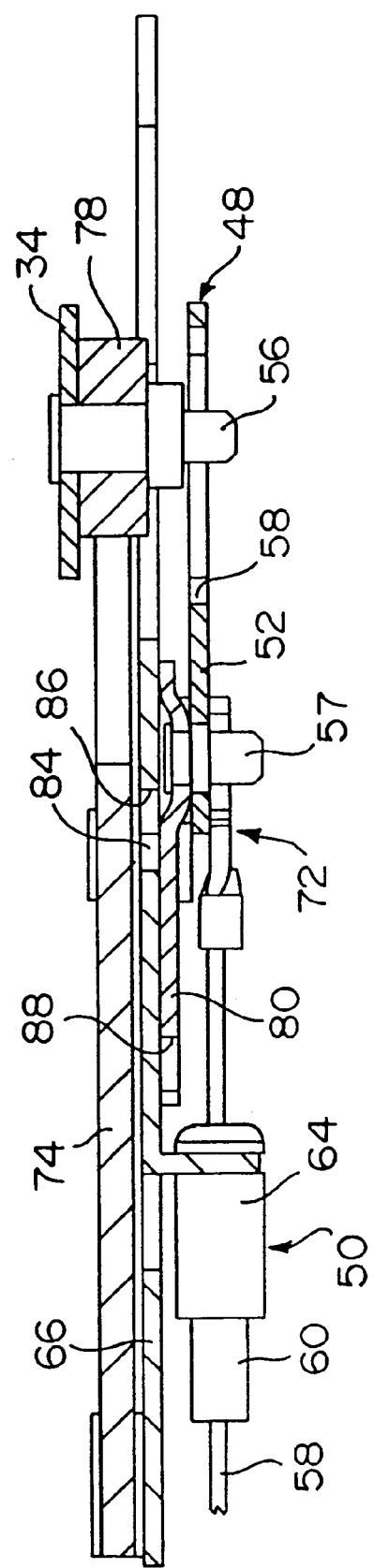

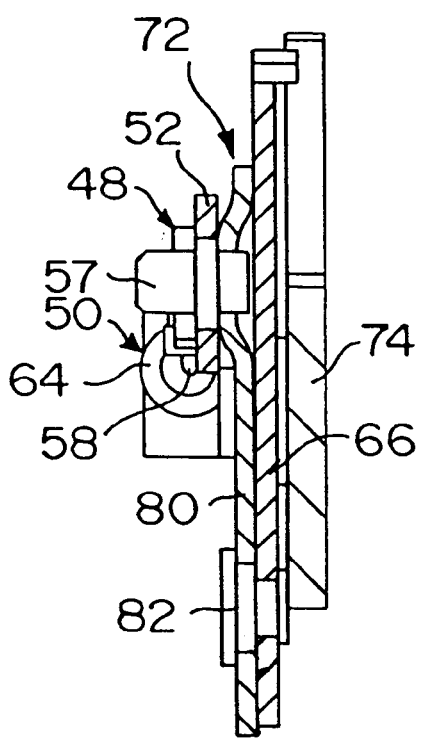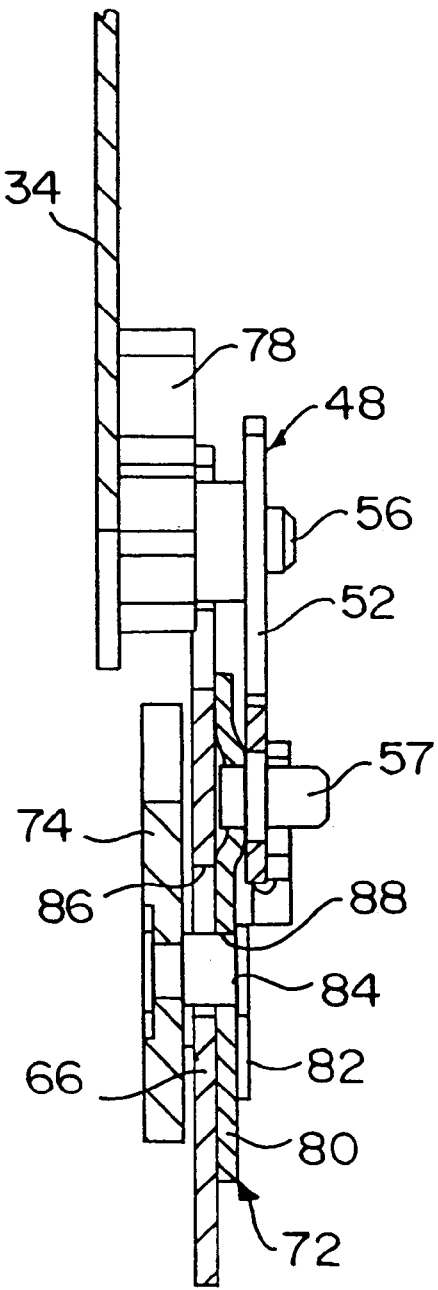

EASY ENTRY SEAT WITH SEAT BACK LOCKOUT UNTIL FULL RETURN

This is a continuation of application Ser. No. 08/760,875, filed Dec. 9, 1996, now abandoned.

BACKGROUND OF THE INVENTION

Field of the Invention

This invention relates to vehicle seats and more particularly to improvements in vehicle seats of the type that are capable of being moved forwardly to provide access to a rear compartment in the vehicle.

Background of the Invention

Virtually, all automobile vehicles provide at least a driver's seat which is capable of fore and aft adjustment to accommodate the size of the driver. In two door sedan vehicles the normal operative range of adjustment is often extended forwardly to provide an access position. Moreover, the seat back cushion assembly of the seat is mounted for movement forwardly from a seat back operating position to a seat back access position overlying the seat cushion assembly. After the front seat has been moved to its seat access position to accommodate rear passengers, it becomes necessary to return the seat rearwardly into an operating position. A releasable seat locking mechanism is provided for locking the seat in an operating position and for releasing the seat for forward movement into the access position. Similarly, a releasable seat back locking mechanism is provided which is capable of being manually moved between a locking position retaining the seat back cushion assembly in a seat back operating position and a releasing position enabling the seat back cushion assembly to be moved forwardly into its seat back access position. Usually, a motion transmitting mechanism is provided which causes the movement of the seat back cushion assembly into its access position to move the seat locking mechanism into its releasing position.

In its simplest form, a seat once moved into its access position can be moved back into any operating position within the range of operating positions provided without regard to the particular operating position it was in before it was moved forwardly. Other seats provide the user with the capability of returning the seat back into the exact operating position from which it started. This capability can be provided either by the use of an adjusting mechanism for the access movement which is separate from the normal operating adjustment or by using a memory mechanism (e.g., see related application Ser. No. 08/534,990, Docket No. 115).

One problem which is presented in all of these access type seats is that it can sometimes occur that the seat back is properly returned and locked into its seat back operating position but the seat is improperly returned and fails to lock in a seat operating position. It may be possible to subsequently operate the vehicle on the road without the operator realizing that the seat is in fact unlocked and capable of unwanted forward movement which can present a hazardous circumstance. The present invention recognizes the need to obviate the above problem and is based upon the underlying concept of making the return of the seat back onto a seat back operating position dependent upon the seat being properly returned and locked. With this concept, the fact that the seat back is not in a comfortable position for the operator to drive the vehicle reminds the operator that the seat is not fully locked and should be placed in such a condition before proceeding.

BRIEF DESCRIPTION OF THE INVENTION

Accordingly, it is an object of the present invention to obviate the above-described problem in accordance with the above expressed concept. In accordance with the principles of the present invention, this objective is achieved by providing a vehicle seat which comprises seat cushion assembly constructed and arranged to support a vehicle occupant seated thereon, a seat back cushion assembly constructed and arranged to support the back of a vehicle occupant, and a seat mounting assembly constructed and arranged to mount the seat cushion assembly on a vehicle floor for forward and rearward movements. The seat mounting assembly includes a releasable seat locking mechanism constructed and arranged to be moved between a locking position locking the seat mounting assembly to fixedly retain the seat cushion assembly in a seat operating position and a releasing position releasing the seat mounting assembly to allow forward movement of the seat cushion assembly from a seat operating position into a seat access position and rearward movement the seat cushion assembly from the seat access position into a seat operating position. A seat back mounting assembly is disposed between the seat and seat back cushion assemblies and is constructed and arranged to mount the seat back cushion assembly on the seat cushion assembly for forward and rearward movements together and for movement of the seat back cushion assembly relative to the seat cushion assembly (1) forwardly from a seat back operating position suitable to support the back of a vehicle occupant seated on the seat cushion assembly into a seat back access position overlying the seat cushion assembly and (2) rearwardly from the seat back access position into a seat back operating position. The seat back mounting assembly includes a releasable seat back locking mechanism operatively associated with the seat back mounting assembly constructed and arranged to be capable of manually controlled movements between a locking position locking the seat back mounting assembly to prevent forward movement of the seat back cushion assembly from a seat back operating position into the seat back access position and a releasing position releasing the seat back mounting assembly to allow forward movement of the seat back cushion assembly into the seat back access position and rearward movement therefrom into a seat back operating position. A motion transmitting mechanism is operatively associated with the releasable seat locking mechanism and is constructed and arranged to transmit a forward movement of the seat back cushion assembly from a seat back operating position to a movement of the releasable seat locking mechanism from the locking position thereof into the releasing position thereof so as to permit a cycle of access movement which includes (1) the aforesaid forward movement of the seat back cushion assembly into the seat back access position and forward movement of the seat and seat back cushion assemblies together from a seat operating position into the seat access position and (2) rearward movements of the seat and seat back assemblies together from the seat access position into a seat operating position and the seat back cushion assembly into a seat back operating position. The motion transmitting assembly and the releasable seat locking assembly are constructed and arranged to move the releasable seat locking mechanism into its locking position when the seat and seat back cushion assemblies are moved rearwardly together into a seat operating position during the cycle of access movement. In accordance with the principles of the present invention, a blocking mechanism is operatively associated with the motion transmitting assembly which is constructed and arranged to be operable during a cycle of access movement to prevent the seat back cushion assembly from reaching a seat back operating position during the rearward movement of the seat back cushion assembly from the seat back access position in the event the aforesaid rearward movement of the seat back cushion assembly precedes the rearward movement of the seat and seat back cushion assemblies together into a seat operating position.

These and other objects of the present invention will become more apparent during the course of the following detailed description and appended claims.

The invention may best be understood with reference to the accompanying drawings wherein an illustrative embodiment is shown.

IN THE DRAWINGS

FIG. 6 is a fragmentary sectional view taken along the line 6—6 of FIG. 2;

FIG. 7 is a fragmentary sectional view taken along the line 7—7 of FIG. 2;

FIG. 8 is a fragmentary sectional view taken along the line 8—8 of FIG. 2;

DETAILED DESCRIPTION OF THE EMBODIMENT OF THE INVENTION SHOWN IN FIGS. 1–8

Figure 1:
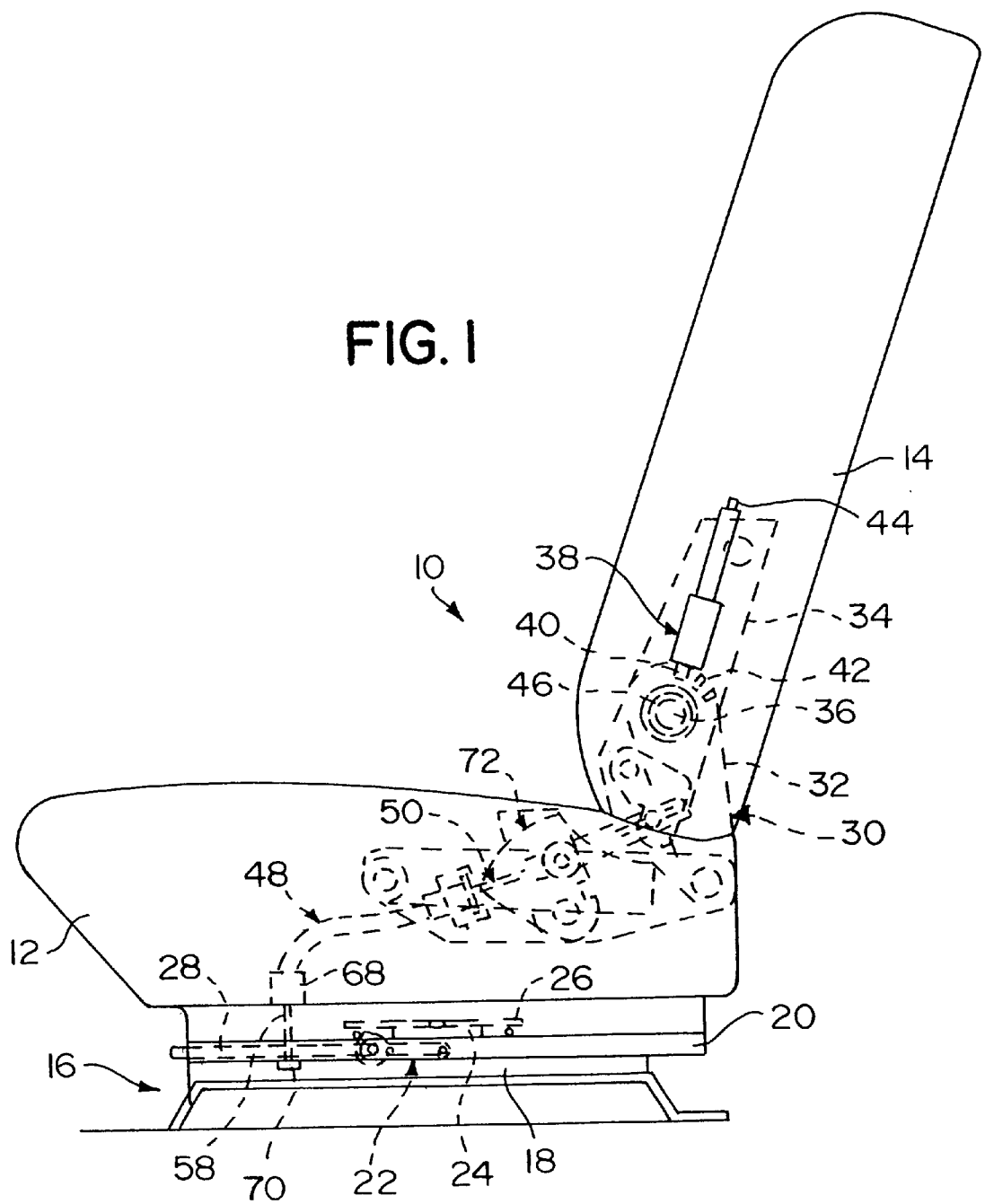
FIG. 1 is a side elevational view of one embodiment of a vehicle seat constructed in accordance with the principles of the present invention showing the seat back cushion assembly when in a blocked position in phantom lines.
Figure 2:
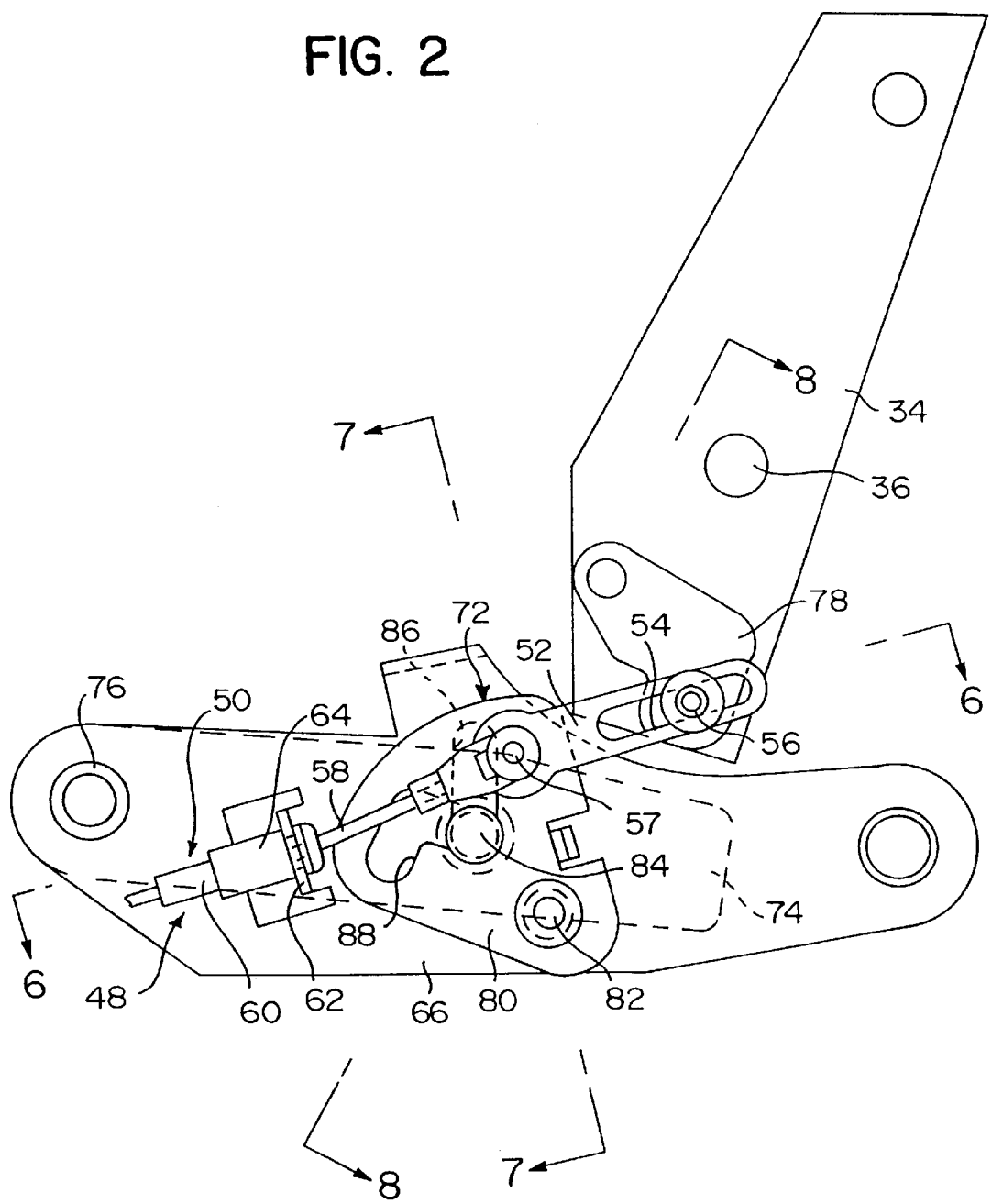
FIG. 2 is a side elevational view of the blocking mechanism of the present invention and its cooperation with the motion transmitting mechanism showing one operating position of the mechanisms.
Figure 3:
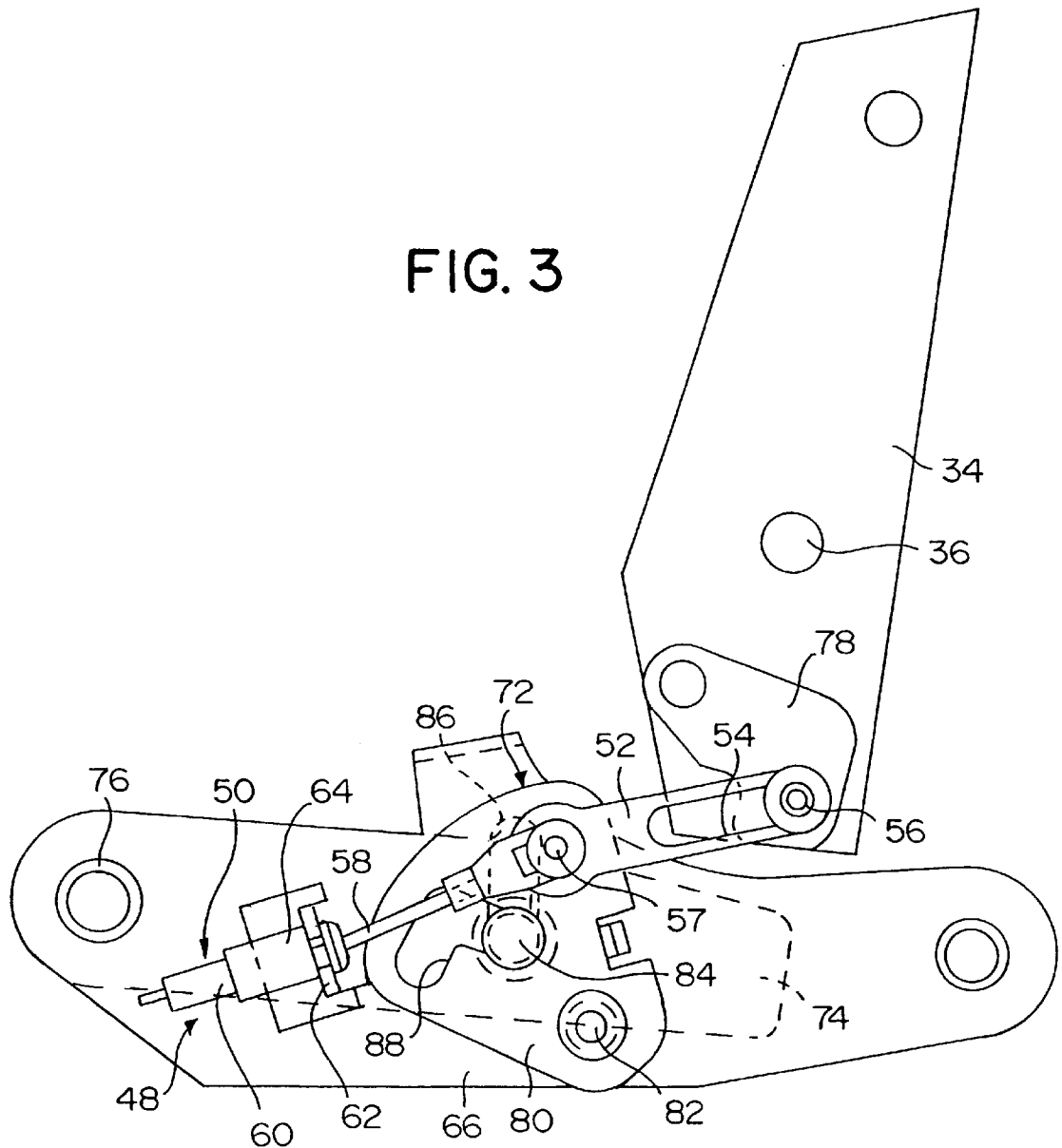
FIG. 3 is a view similar to FIG. 2 showing another operating position of the mechanisms.

Referring now more particularly to the drawings, there is shown in FIGS. 1–8 one embodiment of a vehicle seat, generally indicated at 10, which is constructed in accordance with the principles of the present invention. The seat 10 includes the usual seat cushion assembly 12 and seat back cushion assembly 14. The seat cushion assembly 12 is of any well known construction including the usual frame, cushion and cover configured to accommodate a vehicle occupant when seated. Likewise, the seat back cushion assembly 14 may be of any well known construction including the usual frame, cushion and cover configured to support the back of a vehicle occupant seated on the seat cushion assembly 12.

The seat cushion assembly is mounted on the vehicle floor for forward and rearward movements by a seat mounting assembly, generally indicated at 16. The seat mounting assembly 16 includes a pair of fore and aft extending lower track sections 18 mounted in fixed parallel relation on the vehicle floor and a cooperating pair of upper track sections 20 mounted on the fixed track sections 18 for forward and rearward movements with respect to the lower track sections 18. The seat cushion assembly 12 is fixedly mounted on the upper track sections 20 so as to be movable therewith with respect to the vehicle floor.

The seat mounting assembly 16 also includes a releasable seat locking mechanism, generally indicated at 22. As shown, the track sections 18 and 20 and the releasable seat locking mechanism are preferably constructed in accordance with the disclosure of copending U.S. patent application, Ser. No. 08/527,727, Docket No. 133. Although it will be understood that other constructions are contemplated as well. The embodiment shown includes a locking mechanism 22 for each pair of upper and lower track sections, with each locking mechanism 22 including a locking structure 24 mounted on the associated upper track section 20 for vertical movements between an upper locking position locking the seat mounting assembly to fixedly retain the seat mounting assembly 16 in a seat operating position and a releasing position releasing the seat mounting assembly 16 to allow forward movement of the seat cushion assembly 12 from a seat operating position, as shown in FIG. 1, into a seat access position and rearward movement of the seat cushion assembly 12 from the seat access position into a seat operating position. The locking action is achieved by the movement of the locking structure 24 upwardly under the bias of a spring 26 into its locking position wherein portions of the locking structure enter into downwardly facing notches formed in the fixed track sections 18. The multiplicity of longitudinally spaced downwardly facing notches enable the seat 10 to be locked in a plurality of different operating positions within a range of operating positions. In addition to the range of operative positions, the arrangement also accommodates movement of the seat cushion assembly into an access position spaced forwardly from the forwardmost operating position of the range provided.

In the embodiment shown, the releasable seat locking mechanism 22 also includes a manually engageable structure 28 in the form of a U-shaped bail having its bight portion disposed under the forward portion of the seat cushion assembly 12 in a position to be conveniently gripped manually by a user. The legs of the U-shaped bail 28 are pivoted intermediate their lengths to the upper track sections and the free ends of the legs are connected with the locking structure 24 so that the locking structure 24 will be moved downwardly against the bias of spring 26 from its locking position into its releasing position when the user pulls upwardly on the bight portion of the U-shaped bail 28.

With the simple structural arrangement shown in FIG. 1, once the seat cushion assembly 12 is moved into its access position, it can be returned into any one of its operating positions. It will be understood that the present invention contemplates the utilization of a releasable seat locking mechanism of the memory type having a memory mechanism for automatically insuring that the seat cushion assembly 12 will be returned to the same operating position that it started from. An example of such a memory mechanism is disclosed in copending application, Ser. No. 08/34,990, Docket No. 115.

The seat 10 also includes a seat back mounting assembly, generally indicated at 30, which is disposed between the seat cushion assembly 12 and the seat back cushion assembly 14. The seat back mounting assembly 30 at each side of the seat includes a mounting bracket 32 fixed to the frame of the seat cushion assembly 12 and a mounting plate 34 fixed to the frame of the seat back cushion assembly 14 which is pivotally mounted on the mounting bracket 32 by a pivot pin 36.

The seat back mounting assembly 30 also includes a releasable seat back locking mechanism, generally indicated at 38. The locking mechanism 38 may be constructed in accordance with any known arrangement. A somewhat schematic arrangement is shown which includes a locking structure 40 in the form of a detent capable of being moved into and out of any one of an arcuate row of notches formed in a sector member 42 fixed to the mounting plate 34. Movement of the detent 40 is under the control of a manually engageable structure 44. In accordance with usual practice, the seat back mounting assembly 30 includes a torsion spring 46 for biasing the seat back cushion assembly 14 into a forwardmost seat back operating position. The seat back cushion assembly 14 can be pivoted rearwardly about the pivot pin through a range of seat back operating positions by the occupant simply pushing back on the seat back cushion assembly 14 when the locking structure 40 is in a releasing position as when the manually engageable structure 44 is retaining detent 40 out of a notch in the sector 42. By releasing the manually engageable structure 44, the occupant is enabled to control the spring biased movement of the detent 40 into a selected notch in the sector 42 so as to determine the seat back operating position of the seat back cushion assembly 14 within the range provided.

Movement of the manually engageable structure 44 into its releasing position also enables the seat back cushion assembly 14 to be moved forwardly about pivot pin 36 into a seat back access position overlying the seat cushion assembly 12. While in the embodiment shown the access movement and range of operating movements are provided by a single pivot, the present invention contemplates the utilization of a seat back mounting assembly which provides two spaced pivots in accordance with known practice. An example of a two pivot arrangement is disclosed in copending application Ser. No. 08/377,007, Docket 105.

The seat 10 of the present invention also contemplates the provision of a motion transmitting mechanism, generally indicated at 48. The motion transmitting mechanism 48 is connected between the seat back cushion assembly 14 and the releasable seat locking mechanism 22 in such a way that the movement of the seat back cushion assembly 14 from a seat back operating position into the seat back access position causes the locking structure 24 of the releasable locking mechanism 22 to be moved from its locking position into its releasing position. To this end, the motion transmitting mechanism 48 is in the form of a Bowden wire assembly, generally indicated at 50, and a connecting link 52. The connecting link 52 includes an elongated slot 54 in one end thereof within which a pin 56 rides. The pin 56 is fixed to the mounting plate 34 in spaced relation below the pivot pine 36. The opposite end of the connecting link 52 is connected, as at 57, to one end of a cable 58 forming a part of the Bowden wire assembly. The Bowden wire assembly also includes a sheath or flexible tube 60 within which the cable extends for guided longitudinal movement with respect thereto. One end of the flexible tube 60 is fixed to a bracket 62 as indicated at 64. The bracket 62 is struck from a mounting plate 66 which is carried by the seat cushion assembly 12 as by being fixed to the frame thereof. As best shown in FIG. 1, the opposite end of the flexible tube 60 is suitably fixed, as indicated at 68, to the frame of the seat cushion assembly 12 at a position above a leg of the U-shaped bail 28. The opposite end of the cable 58 extends from the end 68 of the flexible tube 60 and then loosely through an opening in the leg of the U-shaped bail 28 (or an opening in a suitable bracket fixed thereto). The lower extremity of the cable 58 has a head 70 fixed thereon in engagement with the underside of the bail. The arrangement provides a one-way connection of the cable 58 with the bail 28 which enables an upward movement of the head 70 to move the bail 28 upward which, in turn, moves the locking structure 24 from its locking position into its releasing position. Conversely, the bail 28 can be manually moved upwardly without moving the cable which simply slides in the bail opening through which it extends.

The motion transmitting mechanism 48 enables the seat 10 of the present invention to be moved through a cycle of access movement which includes a movement of the seat back cushion assembly 14 from a seat back operating position into the seat back access position which releases the seat cushion assembly 12 to be moved forwardly together with the seat back cushion assembly 14 into a seat access position. The cycle also includes a rearward movement of the seat and seat back cushion assemblies 12 and 14 together from the seat access position into a seat operating position and a rearward movement of the seat back cushion assembly from its seat back access position into a seat back operating position.

In accordance with the principles of the present invention, a blocking mechanism, generally indicated at 72, is operatively associated with the motion transmitting mechanism 48 so as to be operable during a cycle of access movement to prevent the seat back cushion assembly 14 from reaching a seat back operating position during the rearward movement of the seat back cushion assembly 14 from the seat back access position thereof in the event that the aforesaid rearward movement of the seat back cushion assembly 14 precedes the rearward movement of the seat and seat back cushion assemblies together into a seat operating position and the movement of the releasable seat locking mechanism 22 into its locking position.

As shown, the blocking mechanism 72 includes an elongated blocking member or lever 74 pivotally mounted at one end of the mounting plate 66, as indicated at 76, to move between an inoperative position and a blocking position. The free end of the blocking member 74 when in its blocking position cooperates with an abutment member 78 fixed to the mounting plate 34 at the lower end portion thereof. As shown, the abutment member 78 is angular or L-shaped in configuration arranged to cooperate with the free end of the blocking member 74 so that one leg limits the upward movement of the blocking member 74 while the other leg provides a forwardly facing abutting surface for engaging a rearwardly facing free end surface of the blocking member 74 to thereby block further rearward pivotal movement of the seat back cushion assembly 14 about its pivot 36.

The blocking mechanism 72 also includes a control member 80 of generally triangular plate configuration pivoted at one apex thereof to the mounting plate intermediate its ends as indicated at 82. The control member 80 is pivotally connected at another apex thereof to the connection 57 between the forward end of the connecting link 52 and rearward end of the Bowden wire cable 58. Fixed to the blocking member 74 and extending laterally from one side thereof intermediate its ends is a pin 84 which extends through a slot 86 formed in the mounting plate 66 in arcuate relation about the pivotal axis 76 of the blocking member 74. The pin 84 also extends within an angular or L-shaped slot 88 formed in the final apex of the control member 80. As shown, one leg of the slot 88 is disposed generally arcuately about the pivotal axis of the control member 80 and the other leg extends from the one leg in a direction extending generally between the pivot 82 and pivot 57.

DESCRIPTION OF THE OPERATION OF THE FIGS. 1–8 EMBODIMENT

Figure 4:
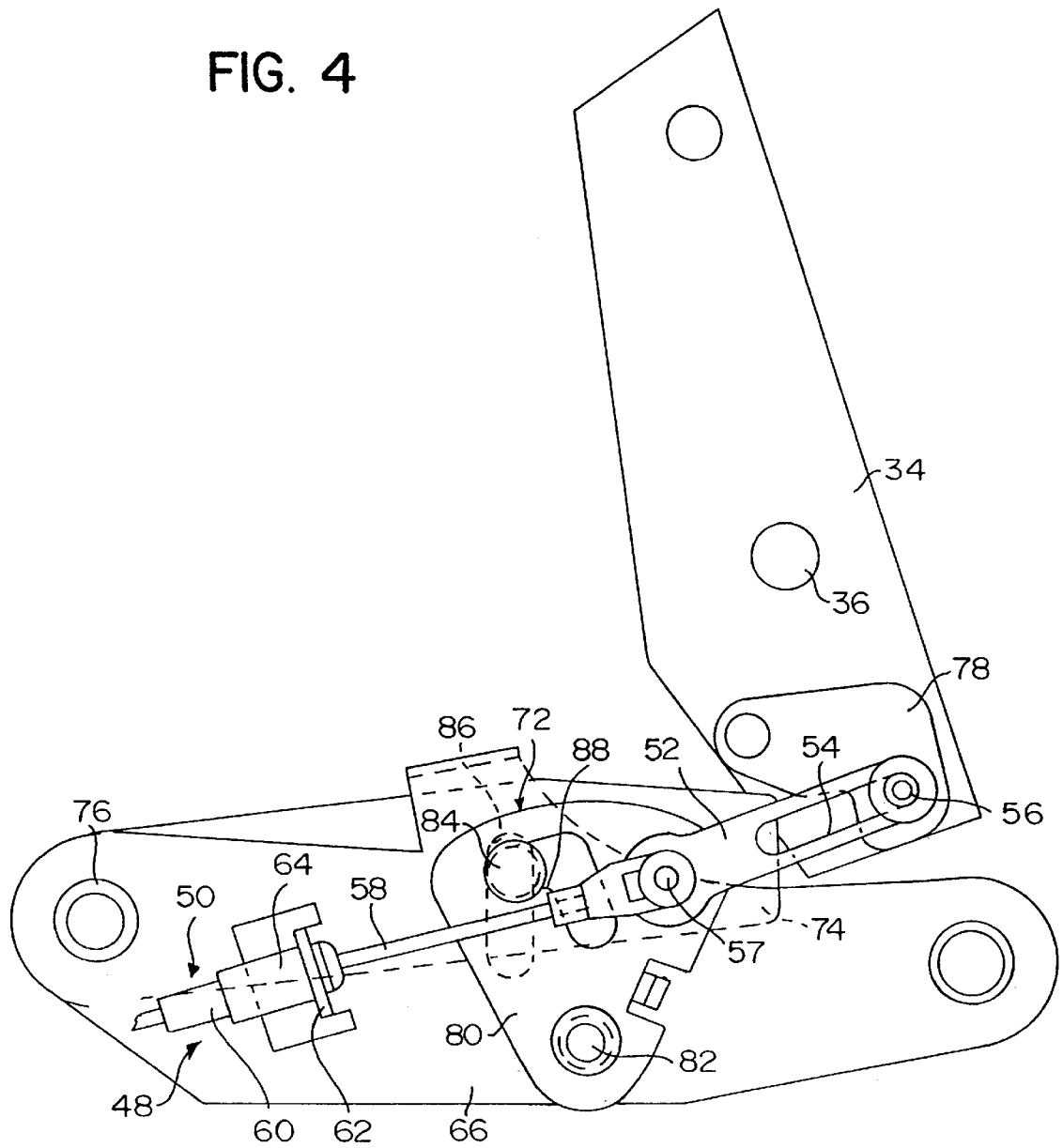
FIG. 4 is a view similar to FIG. 2 showing the access position of the mechanisms.

The seat 10, as depicted in FIGS. 1–8 and described above, operates as follows. When it is desired to move the seat 10 into its access position to allow an occupant to enter the rear compartment of the vehicle, the manually engageable structure 34 of the seat 10 is manually engaged and moved from its locking position into its releasing position. This manual movement allows the seat back cushion assembly 14 to be moved from its seat back operating position forwardly in a pivotal fashion about the pivotal axis 36 into a seat back access position extending over the seat cushion assembly 12. The movement of the seat back cushion assembly 14 from its seat back operating position into its seat back access position will initially move the pin 56 rearwardly within the slot 54 until it reaches the end of the slot. Thereafter, the rearward movement of the pin 56 carries with it the connecting link 52. As the connecting link 52 is moved rearwardly, the pivotal connection 57 of the link 52 with the control member 80 will cause the latter to pivot about pivot 82 in a clockwise direction as viewed in FIG. 2. During this movement, the leg of the L-shaped slot 88 of the control member 80 through which the pin 84 extends acts as a cam with respect to the pin 84 to move the pin 84 through the slot 86 in the mounting plate 66 to thereby cause the blocking member 74 to move from its inoperative position into its blocking position. To reiterate, the clockwise movement of the control member 80 will initially move the pin 84 upwardly within the slot 86 so as to move the blocking member 74 from its normal inoperative position into an upper blocking position as shown in FIG. 4. It will be noted that, as soon as the pin 84 reaches the uppermost position within slot 86, the control member 80 can continue its clockwise movement during which the outer leg of the slot 88 moves with respect to the now held stationary pin 84 into a position adjacent the end of the outer leg of the slot 88.

As best shown in FIG. 1, the aforesaid clockwise movement of the control member 80 also has the effect of moving the Bowden wire assembly 50 of the motion transmitting mechanism 48. This is equivalent to a movement to the right of the upper end of the cable 58 attached to the connection 57 and an upper movement of the lower end of the Bowden wire or cable 58. This movement, in turn, moves the locking mechanism 22 which, in turn, moves the locking structure 24 from its locking position to its releasing position. This allows the seat cushion assembly 12 to be moved forwardly with the seat back cushion assembly 14 from its operating position into its seat access position.

It will be understood that, once the seat 10 has been moved into its seat access position, there are two ways the seat 10 can be returned back into its operating position which relate to the sequence with which the seat cushion assembly 12 and seat back cushion assembly 14 are returned. One way would be to return the seat cushion assembly 12 rearwardly from its access position into its operating position with the seat back cushion assembly 14 in its seat back access position and thereafter move the seat back cushion assembly 14 from its seat back access position into its seat back operating position. The latter movement allows the locking structure 24 to return from its release position into its locking position by virtue of the forward movement of the pin 56 with respect to the motion transmitting mechanism 48. A spring bias acting on the locking mechanism 22 and locking structure 24 as described in the aforesaid application, Dkt. 133 will effect a reverse movement of the Bowden wire 58 which, in turn, will move the control member 80 about its pivotal axis 82 in a counterclockwise direction, as viewed in FIG. 2. The initial portion of this movement will move the outer leg of the slot 88 with respect to the pin 84 through the outer leg to the inner leg of the slot 84. Thereafter, the counterclockwise movement of the control member 80 will cam the blocking member 74 from its blocking position to its inoperative position by virtue of the leg of the L-shaped slot 88 engaging the pin 84. As long as the locking mechanism 24 is returned to its locking position, the blocking member 74 will be moved into its inoperative position. This allows the seat back cushion assembly 14 to be moved fully into an operating position.

It will be understood that where the operation of the seat 10 is such that it must, by virtue of a memory mechanism (not shown) return to its original operating position, it is really the return movement of the seat into its operating position which enables the locking mechanism 24 to return to its locked position. In an arrangement such as shown, the absence of notches beyond the range of operative seat positions provided ensures that the seat must be retained at least to the forwardmost operative position before the locking mechanism can be returned to its locking position. Consequently, so long as the seat back cushion assembly 14 is moved into its operative position after the seat cushion assembly 12 has been moved into a seat operative position, the seat will assume a proper operative relationship.

Figure 5:
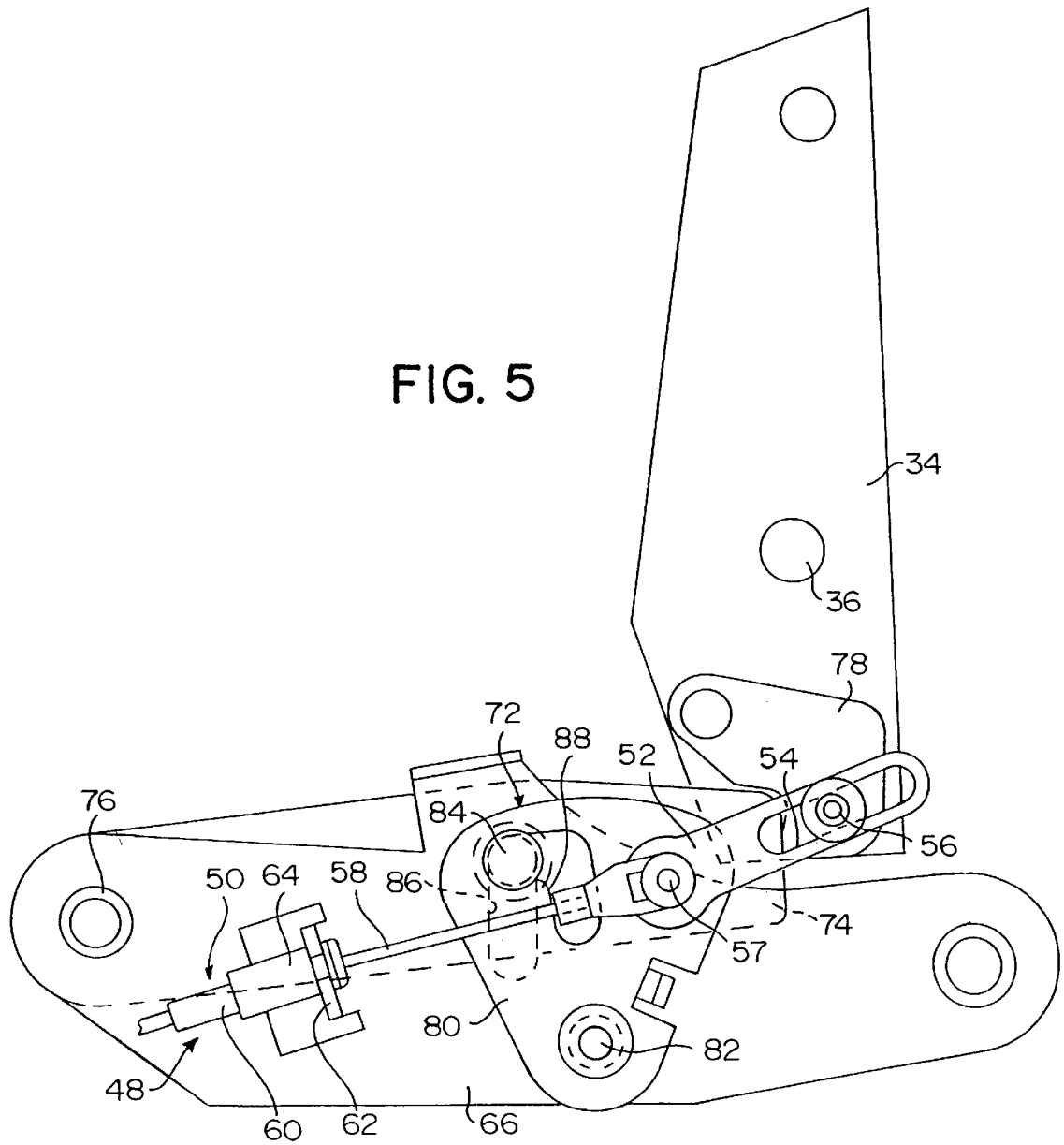
FIG. 5 is a view similar to FIG. 2 showing the blocking position of the mechanisms.

The other mode of returning the seat 10 from its access position into its operating position involves the movement of the seat back cushion assembly 14 initially from its seat back access position toward its operating position prior to the movement of the seat cushion assembly 12 rearwardly from the seat access position thereof. In this regard, it will be noted that the seat back cushion assembly 14 cannot be moved fully into its operating position because the blocking member 74 will be in its blocking position, as shown in FIGS. 4 and 5, so long as the locking structure 24 has not been moved into its locking position. Consequently, this mode of return movement will require the seat to return to its operating position and the locking mechanism to be returned to its locking position before the seat back cushion assembly 14 can be moved fully into its seat back operating position.

In either way, if the seat cushion assembly 12 has not been returned to its operating position and the locking structure 24 returned to its locking position, the seat back cushion assembly 14 cannot be fully returned into an operating position. If the seat 10 should end up in this condition without the locking structure 24 being fully returned to its locking position, the condition of the seat which will be presented to the occupant is one in which the seat back cushion assembly 14 is in a somewhat awkward forwardly extended position so that the operator will be reminded that conditions are not normal and operation of the vehicle should not occur until a normal condition is achieved. Under these circumstances, the operator will make sure the seat 10 is returned fully into an operating position and the locking structure 24 is returned to a locking position. As soon as this occurs, the blocking member 74 will be moved from its blocking position into its inoperative position so that the seat back cushion assembly 14 can be returned to a seat back operating position. In this way, the present invention effectively prevents the seat 10 from being operated by a seat occupant at a time when the seat 10 is not fully locked into an operating position.

DETAILED DESCRIPTION OF THE EMBODIMENT OF THE INVENTION SHOWN IN FIGS. 9–16

Figure 9:
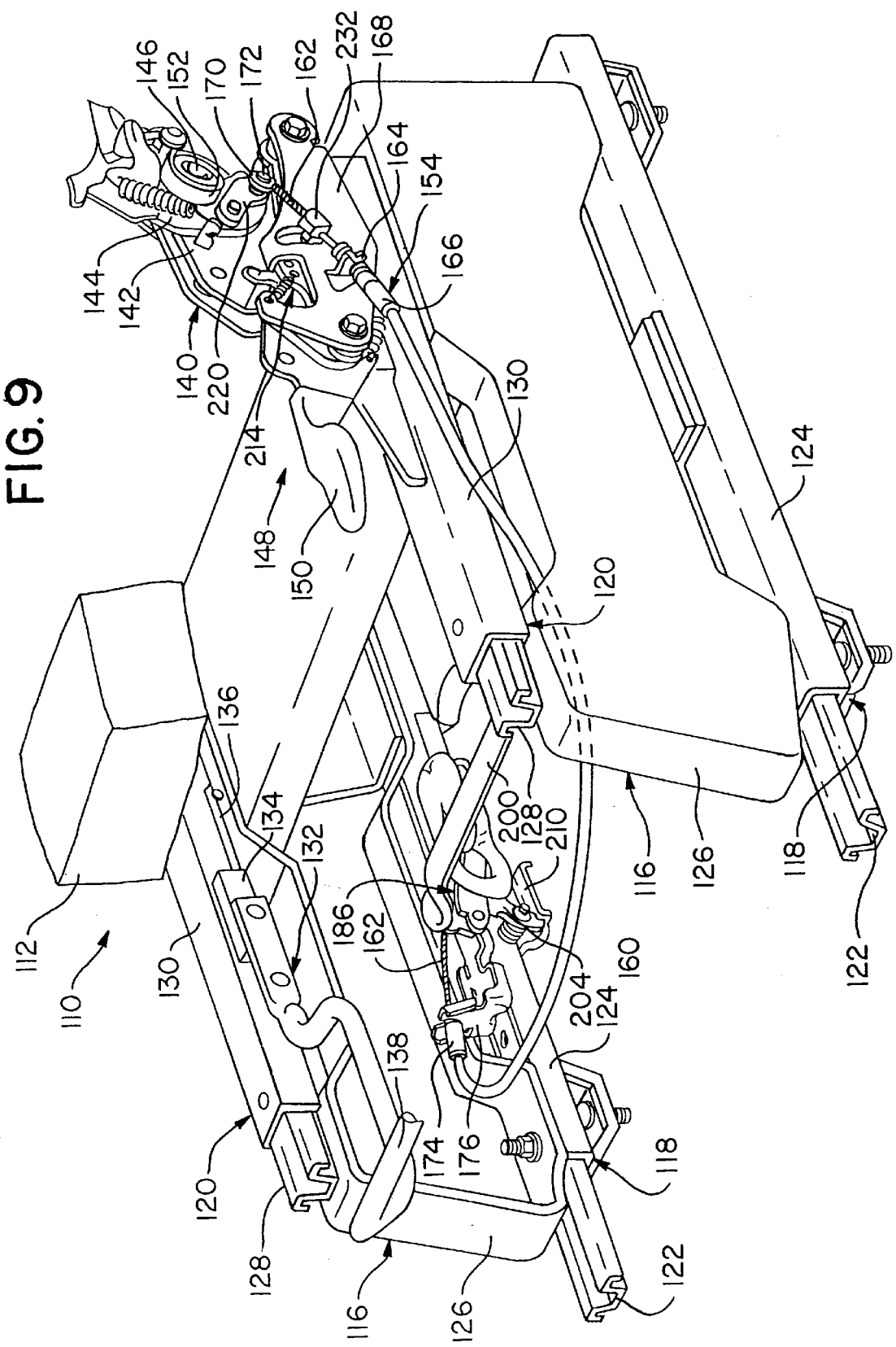
FIG. 9 is a partial perspective view of another embodiment of a vehicle seat constructed in accordance with the principles of the present invention, showing the seat with the seat back cushion assembly removed and other parts broken away for purposes of clearer illustration.
Figure 10:
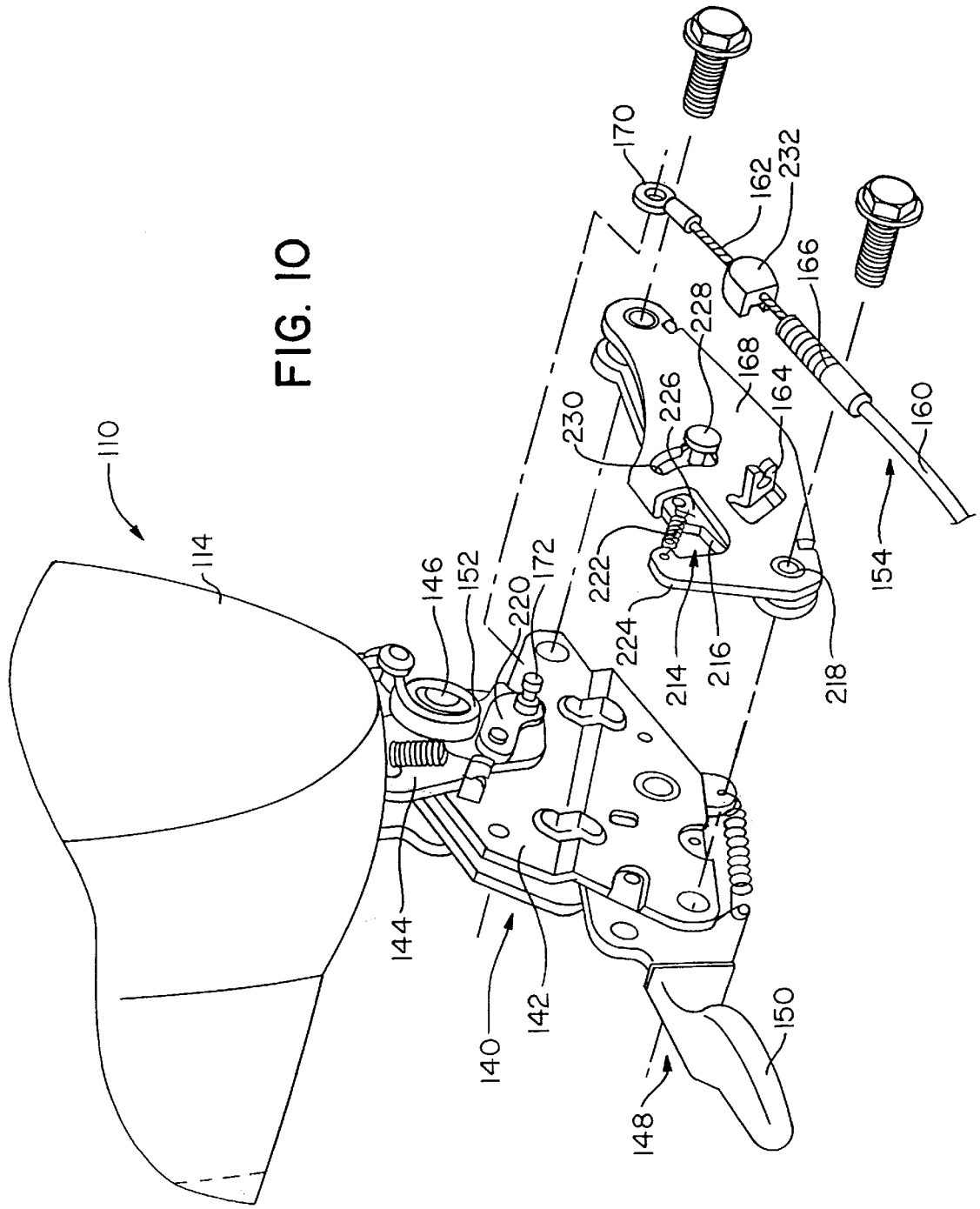
FIG. 10 is a partial exploded perspective view of the portion of the structure shown in FIG. 9 in the area of one end of the motion transmitting mechanism including the blocking mechanism.
Figure 11:
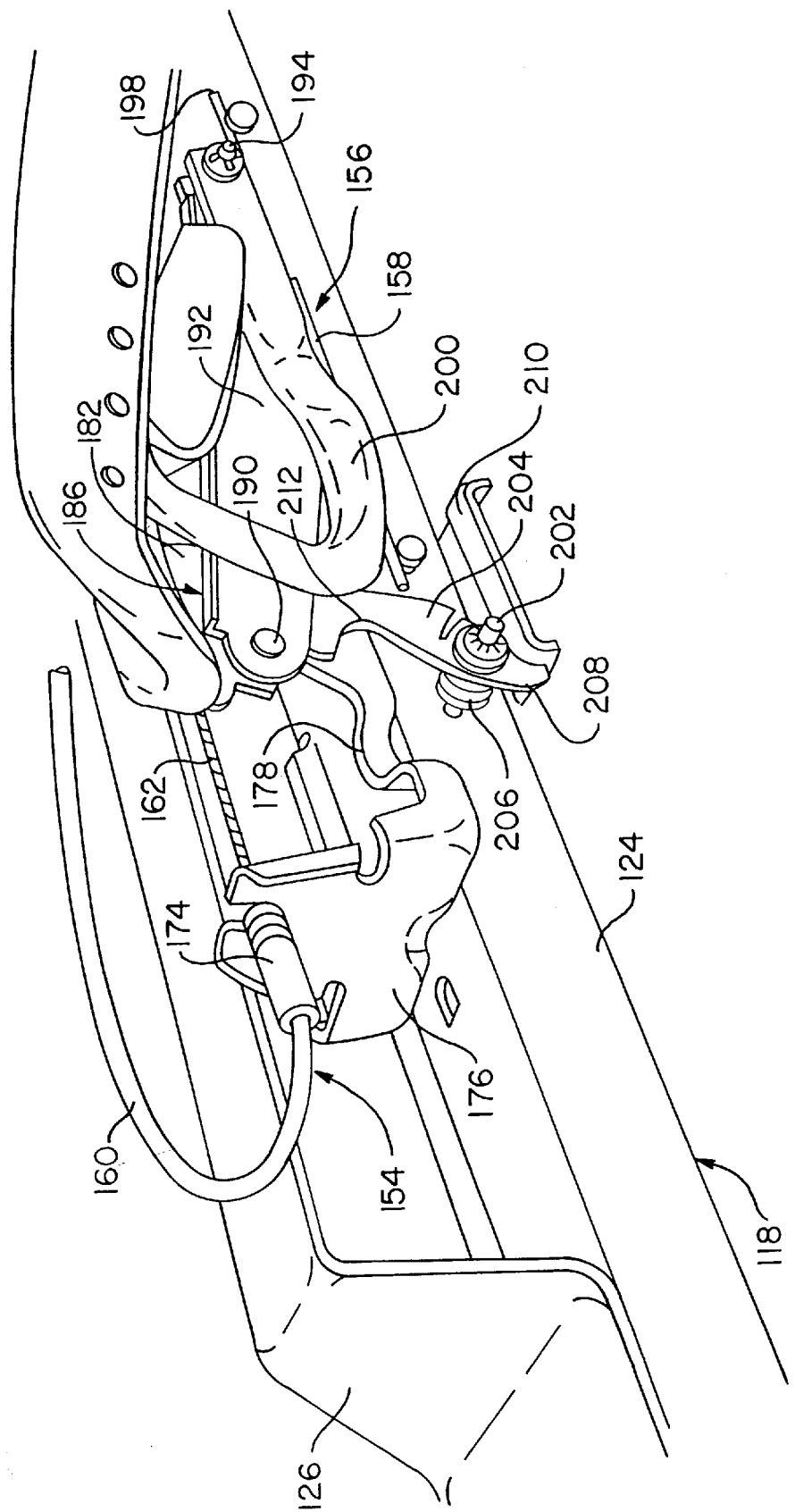
FIG. 11 is a perspective view of the portion of the structure shown in FIG. 9 in the area of the opposite end of the motion transmitting mechanism including the releasable seat locking mechanism.

Referring now more particularly to FIGS. 9–16 of the drawings, there is shown therein another embodiment of a vehicle seat, generally indicated at 110, which is constructed in accordance with the principles of the present invention. As best shown in FIGS. 9 and 10, the seat 110 includes the usual seat cushion assembly 112 and seat back cushion assembly 114. The seat cushion assembly 112 is of any well known construction including the usual frame, cushion and cover configured to accommodate a vehicle occupant when seated. Likewise, the seat back cushion assembly 114 may be of any well known construction including the usual frame, cushion and cover configured to support the back of a vehicle occupant seated on the seat cushion assembly 112.

As best shown in FIG. 9, the seat cushion assembly 112 is mounted on the vehicle floor for forward and rearward movements by a seat mounting assembly, generally indicated at 116. The seat mounting assembly 116 includes a lower set of tracks, generally indicated at 118, and an upper set of tracks, generally indicated at 120. The lower set of tracks 118 includes a pair of fore and aft extending lower track sections 122 mounted in fixed parallel relation on the vehicle floor and a cooperating pair of upper track sections 124 mounted on the fixed track sections 122 for forward and rearward movements with respect to the lower track sections 122. The seat mounting assembly 116 includes an intermediate mounting structure 126 which is fixedly mounted on the upper track sections 124 so as to be movable therewith with respect to the vehicle floor. The upper set of tracks 120 includes lower track sections 128 fixedly mounted on the intermediate mounting structure 126 and cooperating upper track sections 130 mounted on the lower track sections 128 for forward and rearward movements with respect to the lower trash sections 128. The seat cushion assembly 112 is fixedly mounted on the upper track sections 130 so as to be movable therewith with respect to the vehicle floor.

Essentially, the set of upper tracks 120 provide for the movement of the seat cushion assembly 112 into a selected operating position within a range of operative positions while the lower set of tracks 118 provide for the movement of the seat cushion assembly 112 between the selected operating position and a seat access position disposed forwardly thereof. By providing these functions in separate mechanisms, it becomes possible to ensure that the seat cushion assembly 112 will be returned rearwardly from the seat access position into the exact selected operating position where the access cycle of movement was originated.

The seat mounting assembly 116 also includes a releasable seat locking mechanism, generally indicated at 132, associated with the upper set of tracks 120. As best shown in FIG. 9, the track sections 128 and 130 and the releasable seat locking mechanism 132 are preferably constructed in accordance with the disclosure of aforesaid copending U.S. patent application, Ser. No. 08/527,727, Docket No. 133. Although it will be understood that other constructions are contemplated as well. The embodiment shown includes a locking mechanism 132 for each pair of upper and lower track sections 128 and 130, with each locking mechanism 132 including a locking structure 134 mounted on the associated upper track section 130 for vertical movements between an upper locking position locking the seat mounting assembly 116 to fixedly retain the seat mounting assembly 116 in a seat operating position and a releasing position releasing the seat mounting assembly 116 to allow forward movement of the seat cushion assembly 112 from a seat operating position, as shown in FIG. 9, into a seat access position and rearward movement of the seat cushion assembly 112 from the seat access position into a seat operating position. The locking action is achieved by the movement of the locking structure 134 upwardly under the bias of a spring 136 into its locking position wherein portions of the locking structure 134 enter into downwardly facing notches formed in the fixed track sections 128. To reiterate, the fixed track sections 128 are formed with a multiplicity of longitudinally spaced downwardly facing notches enable the seat 110 to be locked in a plurality of different operating positions within a range of operating positions.

In the embodiment shown, the releasable seat locking mechanism 132 also includes a manually engageable structure 138 in the form of a U-shaped bail having its bight portion disposed under the forward portion of the seat cushion assembly 112 in a position to be conveniently gripped manually by a user. The legs of the U-shaped bail 138 are pivoted intermediate their lengths to the upper track sections 130 and the free ends of the legs are connected with the locking structures 134 so that the locking structures 134 will be moved downwardly against the bias of springs 136 from its locking position into its releasing position when the user pulls upwardly on the bight portion of the U-shaped bail 138.

As best shown in FIGS. 9 and 10, the seat 110 also includes a seat back mounting assembly, generally indicated at 140, which is disposed between the seat cushion assembly 112 and the seat back cushion assembly 114. The seat back mounting assembly 140 at each side of the seat includes a mounting bracket 142 fixed to the frame of the seat cushion assembly 112 and a mounting plate 144 fixed to the frame of the seat back cushion assembly 114 which is pivotally mounted on the mounting bracket 142 by a pivot pin 146.

The seat back mounting assembly 140 also includes a releasable seat back locking mechanism, generally indicated at 148. The locking mechanism 148 is of conventional construction as, for example, a mechanism such as disclosed in any one of U.S. Pat. Nos. 4,995,669 or 5,383,710. For the details of construction of the locking mechanism, reference may be made to the disclosure of the above two patents. For present purposes, it is sufficient to note that the locking mechanism includes a manually engageable structure 150 in the form of a lever which in a locking position retains a locking structure (not shown) in locking relation with respect to the seat back mounting assembly 140 to retain the seat back cushion assembly 114 in a seat back operating position. The level 150 is movable from its locking position into a releasing position enabling the seat back cushion assembly to be moved forwardly about pivot pin 146 into a seat back access position overlying the seat cushion assembly 112.

In accordance with usual practice, the seat back mounting assembly 140 includes a torsion spring 152 for biasing the seat back cushion assembly 114 forwardly. The locking mechanism 148, as is the case in the aforesaid patents, may provide for the seat back cushion assembly 114 to be pivoted rearwardly about the pivot pin 146 through a range of seat back operating positions by the occupant simply pushing back on the seat back cushion assembly 114 when the locking structure is in a releasing position.

While in the embodiment shown the access movement and range of operating movements are provided by a single pivot, the present invention contemplates the utilization of a seat back mounting assembly and locking assembly which provides two spaced pivots in accordance with known practice. An exemplary embodiment of a two pivot assembly is disclosed in application Ser. No. 08/377,007, Docket 105.

The seat 110 of the present invention also contemplates the provision of a motion transmitting mechanism, generally indicated at 154. The motion transmitting mechanism 154 is connected between the seat back cushion assembly 114 and a releasable seat locking mechanism, generally indicated at 156, operatively associated with the lower set of tracks 118. The cooperation between the motion transmitting mechanism 154 and the locking mechanism 156 is such that the movement of the seat back cushion assembly 114 from a seat back operating position into the seat back access position causes a locking structure 158 of the releasable locking mechanism 156 to be moved from its locking position into its releasing position.

Figure 12:
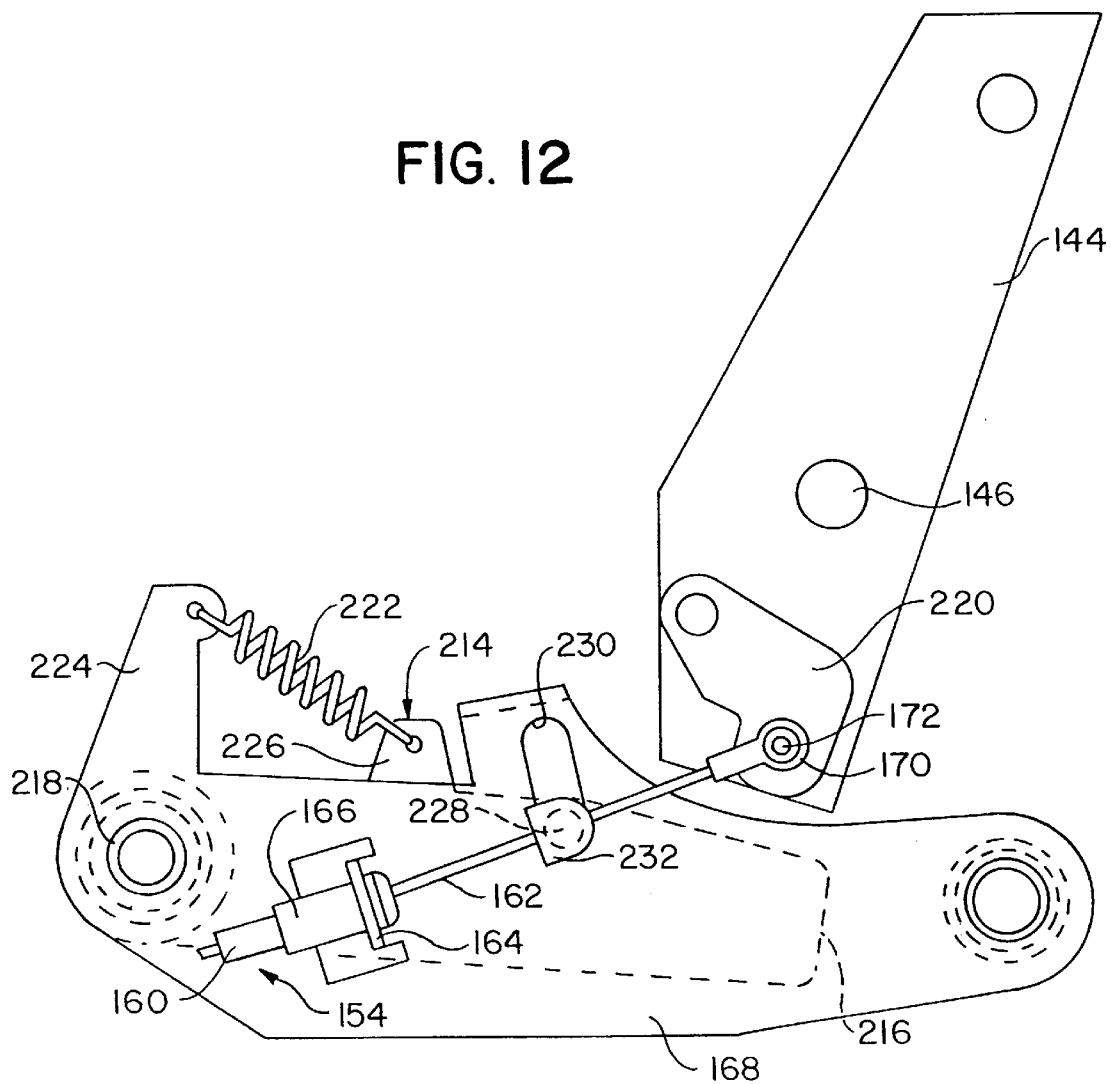
FIG. 12 is a side elevational view of the blocking mechanism and its cooperation with the motion transmitting mechanism showing the blocking mechanism in its inoperative position and the motion transmitting mechanism in an operative position.

The motion transmitting mechanism 156 is in the form of a Bowden wire assembly which includes a sheath or flexible tube 160 within which a cable 162 extends for guided longitudinal movement with respect thereto. As best shown in FIGS. 9, 10 and 12, one end of the flexible tube 160 is fixed to a bracket 164, as indicated at 166. The bracket 164 is struck from a mounting plate 168 which is carried by the seat cushion assembly 112, as by being fixed to the frame thereof and to mounting bracket 142. The adjacent end of the cable 162 is formed with an eyelet 170 which is connected to a pin 172. The pin 172 is fixed to the mounting plate 144 in spaced relation below the pivot pin 146.

As best shown in FIGS. 9, 11 and 14–16, the opposite end of the flexible tube 160 is suitably fixed, as indicated at 174, to a bendable bracket 176. Bendable bracket 176 is integrally formed on one end of a base structure 178 fixed to upper track 124 of an associated lower set of tracks 118. The opposite end of the base structure 178 is lugged to receive a pivot pin 180. A generally triangular shaped actuating member 182 is pivoted at one of its corners to the pivot pin 180 and is apertured at another corner to receive a cylinder member 184 fixed to the opposite end of the cable 162.

The actuating member 182 forms a part of a latchable actuating assembly, generally indicated at 186, for moving the locking mechanism 156 between its locking and releasing positions in response to the movement of the cable 162 of the Bowden wire assembly 154.

Figure 14:
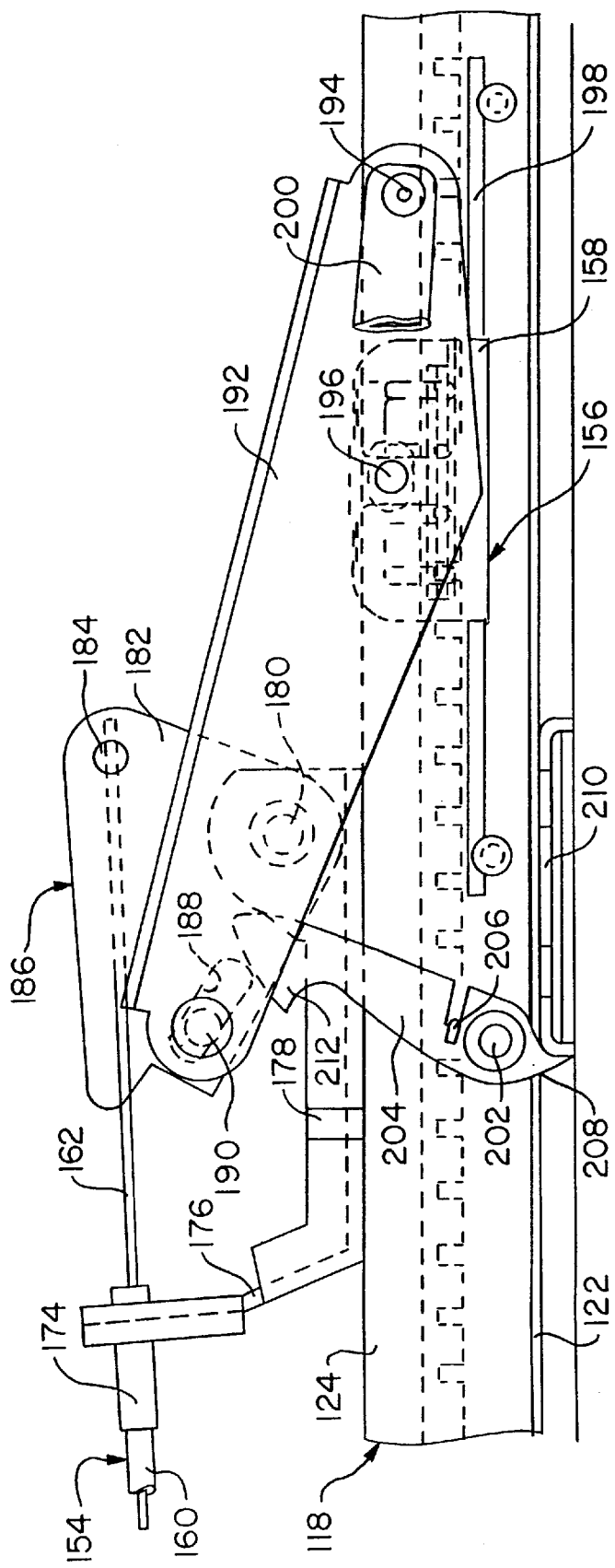
FIG. 14 is a side elevational view of the releasable seat locking mechanism and its cooperation with the motion transmitting mechanism showing the releasable locking mechanism in its locking position.
Figure 15:
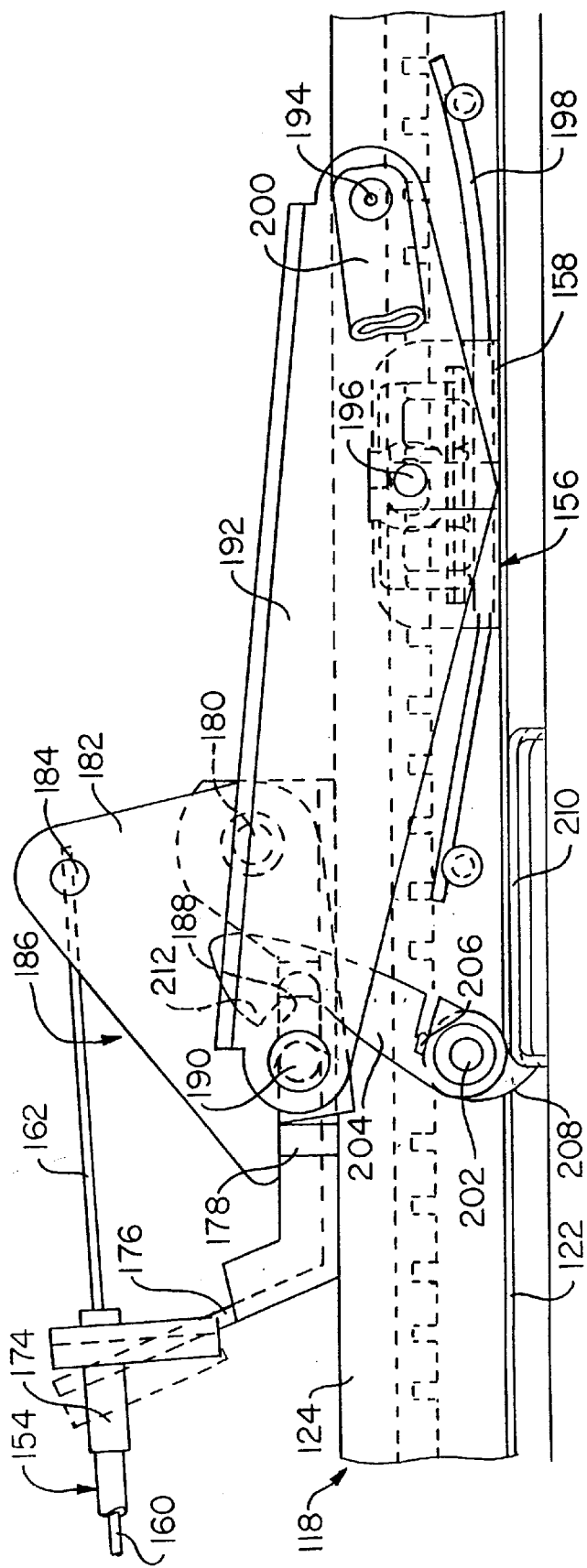
FIG. 15 is a view similar to FIG. 14 showing the releasable seat locking mechanism in its releasing position with the seat still in an operating position.
Figure 16:
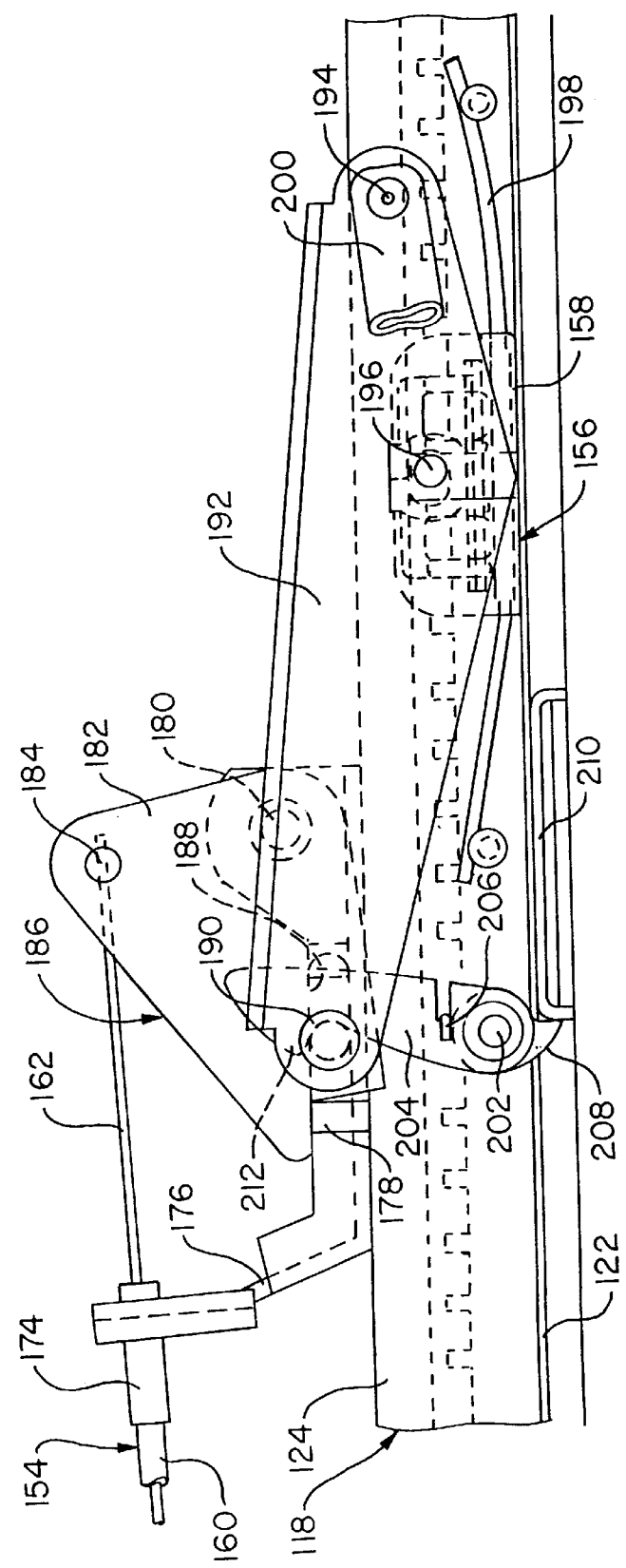
FIG. 16 is a view similar to FIG. 15 with the seat shown in a position moved slightly forwardly of its operating position.

As best shown in FIGS. 14–16, the third corner of the actuating member 182 is formed with a cam slot 188 within which a cam latch pin 190 is slidably disposed. The cam latch pin 190 is fixed in laterally extending relation to one end of an elongated actuating member 192. The opposite end of the elongated actuating member 192 is pivoted, as indicated at 194, to the side of the upper track 124 rearwardly of the locking mechanism 156. As shown, the locking mechanism 156 is constructed in accordance with the disclosure of the aforesaid application Ser. No. 08/527,727, Dkt. No. 133. The elongated actuating member 192 includes a pin 196 which connects with the locking structure 158 of the locking structure 158 to move the same downwardly from its locking position, as shown in FIG. 14, against the bias provided by spring 198. A U-shaped member 200 may be fixed to the elongated actuating member 192 to serve as an actuating member for a corresponding locking mechanism (not shown) for the other set of lower tracks 118.

The motion transmitting mechanism 154 enables the seat 110 of the present invention to be moved through a cycle of access movement which includes a movement of the seat back cushion assembly 114 from a seat back operating position into the seat back access position which releases the seat cushion assembly 112 to be moved forwardly together with the seat back cushion assembly 114 into a seat access position. The cycle also includes a reward movement of the seat and seat back cushion assemblies 12 and 14 together from the seat access position into a seat operating position and a rearward movement of the seat back cushion assembly from its seat back access position into a seat back operating position.

Mounted on the side of the movable lower track 124 forwardly of the locking mechanism 156 and below the base structure 178 is a laterally extending pivot pin 202 on which a latch member 204 is pivoted. A coil spring 206 surrounding the pivot pin 202 is connected with the latch member 204 to bias the latch member 204 to pivot in a counterclockwise direction as viewed in FIG. 14. The latch member 204 includes a depending abutment or stop structure 208 which is positioned to engage the forward portion of a cooperating abutment or stop structure 210 fixedly associated with the fixed lower track 122 when the seat cushion assembly 112 is moved rearwardly from the seat access position thereof back into a seat access position.

The free end of the latch member 204 is formed with a domed hook shaped configuration 212 in a position to engage over the cam latch pin 190 when the actuating assembly 186 is moved by the Bowden wire assembly 154 into a position to move the locking mechanism 156 into its releasing position.

In accordance with the principles of the present invention, a blocking mechanism, generally indicated at 214, is operatively associated with the motion transmitting mechanism 154 so as to be operable during a cycle of access movement to prevent the seat back cushion assembly 114 from reaching a seat back operating position during the rearward movement of the seat back cushion assembly 114 from the seat back access position thereof in the event that the aforesaid rearward movement of the seat back cushion assembly 114 precedes the rearward movement of the seat and seat back cushion assemblies together into a seat operating position and the movement of the releasable seat locking mechanism 156 into its locking position.

As shown, the blocking mechanism 214 includes an elongated blocking member or lever 216 pivotally mounted at one end of the mounting plate 168, as indicated at 218, to move between an inoperative position and a blocking position. The free end of the blocking member 216 when in its blocking position cooperates with an abutment member 220 fixed to the mounting plate 144 at the lower end portion thereof. As shown, the abutment member 220 is angular or L-shaped in configuration arranged to cooperate with the free end of the blocking member 216 so that one leg limits the upward movement of the blocking member 216 while the other leg provides a forwardly facing abutting surface for engaging a rearwardly facing free end surface of the blocking member 216 to thereby block further rearward pivotal movement of the seat back cushion assembly 114 about its pivot 146.

The blocking member 216 is resiliently biased to move toward its blocking position by a coil spring 222. One end of the spring 222 is connected with an upstanding lug 224 on the mounting plate 168. The other end of the spring 222 is connected to an upstanding lug 226 on the blocking member.

In order to move the blocking member 216 against the bias of the spring 222, there is fixed to the blocking member 216 a pin 228 which extends laterally through a slot 230 in the mounting plate 168. The laterally outwardly spaced head of the pin 228 detachably receives a slide member 232 which is slidably mounted on the portion of the cable 162 extending between the eyelet 170 and tube end 166.

When the seat cushion assembly 112 is in a seat operating position, the blocking member 216 is retained in its inoperative position against the bias of the spring 222 by the tension of the end of the cable 162 which extends from the eyelet 170 to the tube end 166 in a position to retain the slide member in the position shown in FIG. 12. This position corresponds with a forwardmost seat back operative position in the case of a reclining seat back cushion assembly 114. It will be noted that, as the seat back cushion assembly 114 is moved rearwardly into other reclining positions, the end portion of the cable 162 extending outwardly from the tube end 166 will become slack and even buckle because the opposite end cannot move. This buckling movement however does not result in a movement of the blocking structure 216 because the outer end thereof is in abutting relation to the lower surface of the abutment 220.

A preferred manner of installing the Bowden wire assembly 154 is set forth below.

The installation of the Bowden wire assembly 154 is preferably begun with the seat 10 in its operative position. Specifically, the seat cushion assembly 112 is in an operative position and the seat back cushion assembly 114 is preferably in the forwardmost operative position if the mounting mechanism provides for reclining. This position of the seat back cushion assembly is essentially shown in FIG. 12. It will be noted that the connector 170 of the Bowden wire cable 162 is connected to the pin 172 and extends therefrom through the flexible tube 160. The associated end of the flexible tube 166 is anchored on the bracket 164 as shown. At the opposite end of the Bowden wire assembly, the opposite end 174 of the Bowden wire 160 is connected with the yieldingly deformable bracket 176 with the bracket 176 in the position shown in dotted lines in FIG. 15.

The maximum amount of the Bowden wire cable 162 which extends outwardly of the end 174 of the flexible tube 166 is fixed by the design of the Bowden wire assembly 154. The initial position of the deformable bracket 176 is spaced from the connecting element 184 a distance greater than the maximum extension so that when the end of the Bowden wire cable 162 is connected with the actuating member 182 to the connection element 184, the actuating member 182 will be positioned in a position intermediate the operative and releasing positions thereof. The operative position of the actuating member 182 corresponds with a maximum cable extent limiting position of the Bowden wire cable 162.

When the actuating member 182 is in the releasing position shown in FIGS. 15 and 16 wherein the corner adjacent the slot 188 is disposed in engagement with the base structure 178 as a stop member, the end of the Bowden wire cable 162 is in a minimum cable extent limiting position.

The sequence in which the ends of the Bowden wire cable 162 are connected to the movable members 220 and 182 respectively and the sequence of connection of the flexible tube ends 166 and 170 with the brackets 164 and 176 respectively is not critical. It is preferable that the flexible tube connections be made first and then the cable connections although these can be reversed and the cable connections can be made with the movable members to which they are connected while they are at different positions than those previously recited so long as they are moved into the positions previously recited before the next step.

The next step is to move the seat back cushion assembly 114 from its operating position forwardly toward and into its seat back access position. This movement has the effect of moving the portion of the Bowden wire cable 162 extending outwardly from the flexible tube end 166 from its minimum cable extent position toward its maximum cable extent position when the seat back cushion assembly 114 reaches its seat back access position.

Since the actuating member 182 is initially disposed in an intermediate position prior to the movement of the seat back cushion assembly 114 from its operative position, the actuating member 182 will be moved into its releasing position with the corner in engagement with the base structure 178 prior to the seat back cushion assembly 114 reaching the seat back access position. As soon as the movement of the actuating member 182 is stopped, the tensile force in the cable 162 is increased and this increase in the tensile force in the cable is resisted by the flexible tube 160. This resistance by the flexible tube 160 places the flexible tube 160 in compression so that the ends tend to move toward the ends of the cable. Since the bracket 176 is designed to yieldably deform before any of the other connections will move, it is the end of the flexible tube 174 which moves under the compressive load of the flexible tube 160 to yieldingly deform the bracket 176 in a direction toward the adjacent end of the Bowden wire cable 162. When the seat back cushion assembly 114 reaches the seat back access position, the yieldable bracket 176 will have been deformed into its operative position as shown in full lines in FIG. 15. With respect to the deformation of the bracket 176, first it will be noted that the bracket is cantilever mounted with the flexible tube 166 and connected to the free outer end. An exemplary material for the bracket 176 is sheet steel preferably constructed, as shown, to provide a flat section spaced from the outer free end and connected with the flexible tube end 166. The portion of the bracket between the inner flat section and the outer free end is flanged to allow bending to be induced in the flat section. This construction enables the deformation or bending to be controlled and more predictable. For example, in the embodiment shown in the application of a 200-pound force by the flexible tube end 166 is sufficient to cause the bracket 176 to yield and deform by bending out the inner flat portion thereof.

DESCRIPTION OF THE OPERATION OF THE FIGS. 9–16 EMBODIMENT

When it is desired to move the seat 110 into its access position to allow an occupant to enter the rear compartment of the vehicle, the manually engageable structure or lever 150 is manually engaged and moved from its locking position into its releasing position. This manual movement allows the seat back cushion assembly 114 to be moved from its seat back operation position forwardly in a pivotal fashion about the pivotal axis 146 into a seat back access position extending over the seat cushion assembly 112. This movement may be accomplished by the spring 152 although the movement can be achieved manually as well depending on the arrangement utilized.

The movement of the seat back cushion assembly 114 from its seat back operating position into its seat back access position will move the pin 117 connected to the end 170 of the Bowden wire cable 162 rearwardly, so that the associated end portion of the Bowden wire cable will be moved out of the associated end 166 of the flexible tube 160. This movement of the Bowden wire cable 162 will be reflected in an inward movement of the opposite end of the Bowden wire cable within the end 174 of the flexible tube 160. This inward movement of the Bowden wire cable 162 from the maximum extent limiting position shown in FIG. 14, serves to move the actuating member 182 from the operative position shown in FIG. 14 into the releasing position shown in FIGS. 15 and 16.

As the actuating member 182 moves away from its operating position in a counterclockwise direction as viewed in FIG. 14, it carries with it by virtue of the engagement of pin 190 within the slot 188, the elongated actuating member 192. As the elongated actuating member 192 is moved from its operating position in a counterclockwise direction about its pivotal axis 194, the pin 196 serves to move the locking structure 158 of the releasable locking mechanism 156 from its locking position into its releasing position.

When the elongated actuating member 192 reaching a position to release the locking mechanism 156, the pin 190 is positioned in a position just forwardly of the hook-shaped end 112 of the latching member 204. As soon as the releasable locking mechanism 156 is moved into its releasing position, the entire seat 110 can now be moved from its seat operating position forwardly into a seat access position. During the initial portion of this movement, the pivot 202 of the latching member 204 moves forwardly allowing the stop structure 208 to assume a different position with respect to the stop structure 210, thereby allowing the spring 206 to pivot the latching member 204 about its pivot 202 and to therefore move the hook-shaped outer end 212 into a position overlying the pin 190, as shown in FIG. 16. Further forward movement of the seat toward its seat access position can now take place with the locking structure 158 of the locking mechanism 156 releasably latched in its releasing position.

After the seat 110 has reached its seat access position, the seat 110 can be returned in either one of two sequences. The first sequence is where the seat cushion assembly 112 is moved back into its seat operating position and thereafter the seat back cushion assembly 114 is moved from its seat back access position into its seat back operating position. The second mode is where the seat back cushion assembly 114 is moved away from its seat back access position prior to t he full movement of the seat cushion assembly 112 to its seat operating position.

In the first instance, it will be noted that as the seat 110 is returned into the seat operating position which it was in when the access cycle was commenced, the stop structure 208 on the latch member 204 will engage the stop structure 210. Further rearward movement of the seat 110 will cause the latch member 204 to pivot in a clockwise direction as viewed in FIG. 14 so as to move the outer hook-shaped end 212 of the latch member 204 out of engagement with the pin 190. It will be noted however that since the seat back cushion assembly 114 is still in its seat back access position, the Bowden wire cable 162 will, by virtue of its tension, retain the actuating member 182 against movement which, in turn, prevents the elongated actuating member 192 from being returned into its operative position. Nevertheless, the seat cushion assembly 112 is positioned at its seat operating position so that as soon as the seat back cushion assembly 114 is moved from the seat back access position thereof into the seat back operating position thereof, the Bowden wire cable 162 will be moved within the flexible tube 160 so as to allow the actuating member 182 to move from the position shown in FIG. 16 to the position shown in FIG. 14 and hence the elongated actuating member 192 from its releasing position into its operative position. The movement of the elongated actuating member 192 into its operating position serves to move the locking structure 158 of the locking mechanism 156 back into its locked position, thus completing an access cycle.

When the second mode of return is undertaken in an access cycle, the seat back cushion assembly 114 is moved away from its seat back access position before the seat cushion assembly 112 is moved back into its operating position. When the seat cushion assembly 112 is out of its operating position, the latch member 204 retains the actuating members 182 and 196 in the position shown in FIGS. 15 and 16, so that as the seat back cushion assembly 114 is moved away from its seat back access position, the pin 172 will be moved forwardly or toward the left as viewed in FIG. 12. Since the opposite end of the Bowden wire cable 162 cannot move by virtue of the fact that latch member 204 is retaining the actuating member 182 in its releasing position, the end portion of the Bowden wire cable 162 extending from the end 166 of the flexible tube 160 becomes slack and begins to buckle. As the slack begins to develop in the end portion of the Bowden wire cable 162, the connecting element 232 on the pin 228 carried by the locking member 216 is moved upwardly within the slot 230 by virtue of the spring 222 biasing the blocking member 216 upwardly. This upward movement of the blocking member 216 is a pivotal movement about pivot 218 in a counterclockwise direction, as viewed in FIG. 12. By this movement, blocking member 216 moves from the inoperative position, shown in FIG. 12, to the blocking position, shown in FIG. 13. In the blocking position, it will be noted that the free end of the blocking member 216 is disposed in a position to engage with the abutment member 220. This prevents the seat back cushion assembly 114 from being fully returned to its seat back operating position. The engagement of the blocking member 216 against the abutment member 220 retains the seat back cushion assembly 114 in an unnatural slightly forwardly inclined position which would be uncomfortable to any seat occupant and would therefore alert the seat occupant that the seat 110 is not in its proper operating position.

Figure 13:
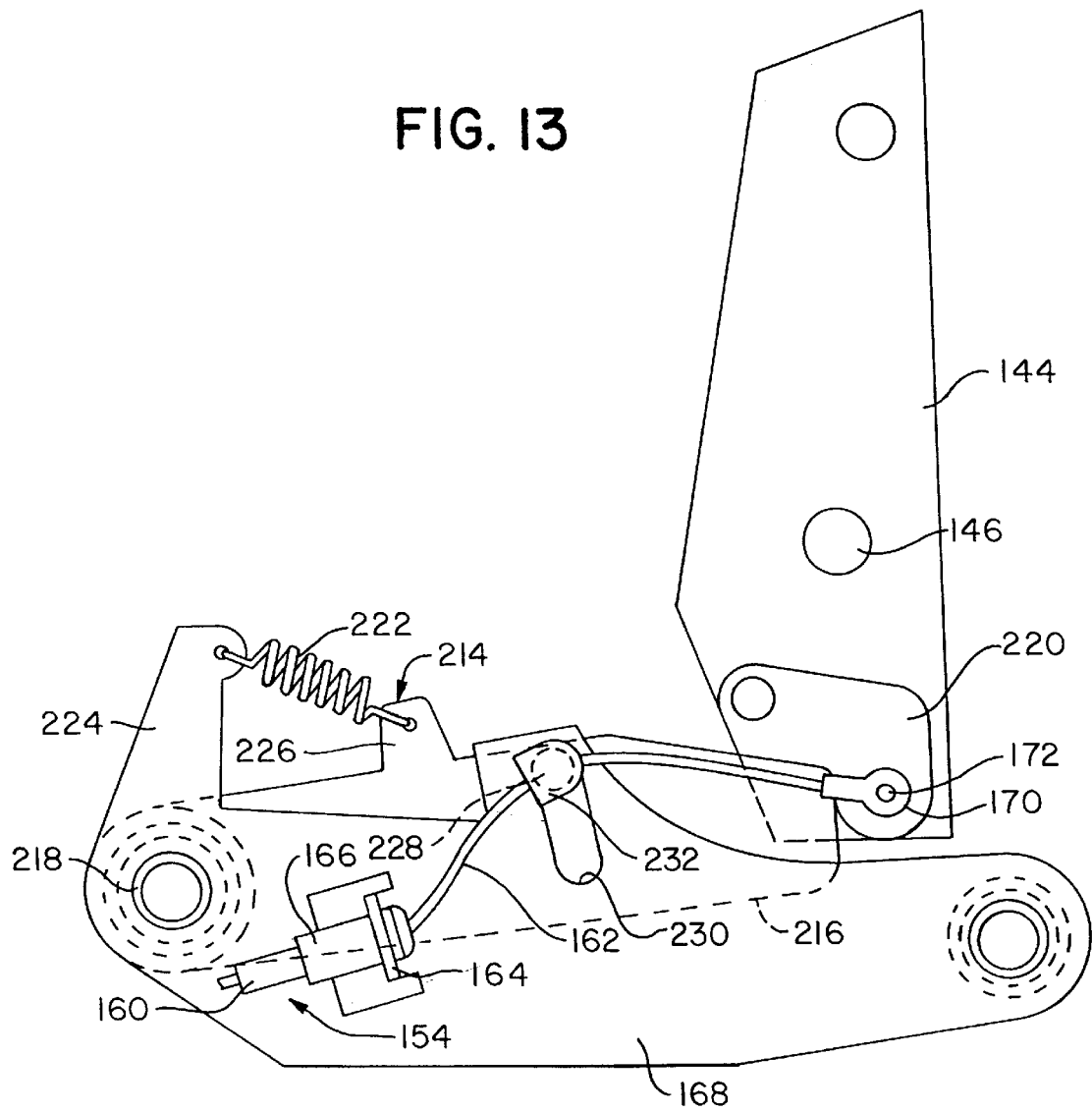
FIG. 13 is a view similar to FIG. 12 showing the blocking mechanism in its blocking position.

As soon as the seat cushion assembly 112 is fully returned into its seat operating position, the bias acting on the actuating assembly 186 will effect the movement of the actuating mechanism 186 from the position shown in FIG. 15 to the position shown in FIG. 14, which movement has the effect of taking up the slack in the end portion of the Bowden wire cable which extends from the end of the flexible tube 166. As the end of the cable 162 is tensioned by this movement, the connecting member 232 on the cable 162 moves the pin 228 downwardly within the slot 230 which, in turn, allows the blocking member 216 to move from its blocking position, as shown in FIG. 13, into its inoperative position, as shown in FIG. 12. As soon as the blocking member 216 moves out of engagement with the abutment member 220, the seat back cushion assembly 114 is allowed to return to its seat back operating position which, in turn, allows the entire actuating assembly 186 to return to its operative position and, hence, the locking structure 158 of the locking mechanism 156 to return to its locked position.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiments have been shown and described for the purpose of illustrating the functional and structural principles of this invention and is subject to change without departure from such principles. Therefore, this invention includes all modifications encompassed within the spirit and scope of the following claims.

What is claimed is:

1. A vehicle seat comprising:

a seat cushion assembly constructed and arranged to support a vehicle occupant seated thereon, a seat back cushion assembly constructed and arranged to support the back of a vehicle occupant, a seat mounting assembly constructed and arranged to mount said seat cushion assembly on a vehicle floor for forward and rearward movements, said seat mounting assembly including a releasable seat locking mechanism constructed and arranged to be moved between a locking position locking said seat mounting assembly to fixedly retain said seat cushion assembly in a seat operating position and a releasing position releasing said seat mounting assembly to allow forward movement of said seat cushion assembly from a seat operating position into a seat access position and rearward movement of said seat cushion assembly from said seat access position into a seat operating position, a seat back mounting assembly disposed between said seat and seat back cushion assemblies, said seat back mounting assembly being constructed and arranged to pivotally mount said seat back cushion assembly on said seat cushion assembly for forward and rearward movements together and for pivotal movement of the seat back cushion assembly relative to said seat cushion assembly about a seat pivot axis (1) forwardly from a seat back operating position suitable to support the back of a vehicle occupant seated on said seat cushion assembly into a seat back access position overlying the seat cushion assembly and (2) rearwardly from said seat back access position into a seat back operating position, said seat back mounting assembly including a releasable seat back locking mechanism operatively associated with said seat back mounting assembly, said releasable seat back locking mechanism being constructed and arranged to be capable of manually controlled movements between a locking position locking said seat back mounting assembly to prevent forward movement of said seat back cushion assembly from a seat back operating position into said seat back access position and a releasing position releasing said seat back mounting assembly to allow forward movement of said seat back cushion assembly into said seat back access position and rearward movement therefrom into a seat back operating position, said seat back mounting assembly having a generally forwardly facing abutment surface located generally below the pivot axis thereof;

a motion transmitting mechanism is operatively associated with said releasable seat locking mechanism, said motion transmitting mechanism being constructed and arranged to transmit a forward movement of said seat back cushion assembly from a seat back operating position to a movement of said releasable seat locking mechanism from the locking position thereof into the releasing position thereof so as to permit a cycle of access movement which includes (1) the aforesaid forward movement of said seat back cushion assembly into said seat back access position and forward movement of said seat and seat back cushion assemblies together from a seat operating position into said seat access position and (2) rearward movements of said seat and seat back assemblies together from said seat access position into a seat operating position and said seat back cushion assembly into a seat back operating position, said motion transmitting mechanism and said releasable seat locking mechanism being constructed and arranged such that said releasable seat locking mechanism moves into its locking position when said seat and seat back cushion assemblies are moved rearwardly together into a seat operating position during said cycle of access movement, and a blocking mechanism operatively associated with said motion transmitting mechanism, said blocking mechanism including a blocking member mounted for pivotal movement about a blocking member pivot axis which is located generally forwardly of the abutment surface of said seat back mounting assembly and having a generally rearwardly facing abutment surface which is engageable with the forwardly facing abutment surface of said seat back mounting assembly;

said blocking member being movable between (1) a blocking position wherein, when said seat back cushion assembly is in said seat back access position thereof, said abutment surface of blocking member is positioned to engage the abutment surface of said seat back mounting assembly in cooperating abutting relation and thereby prevent movement of said seat back cushion assembly from said seat back access position thereof to said seat back operating position thereof and (2) an inoperative position wherein said blocking member allows said seat back cushion assembly to be moved from said seat back access position thereof to said seat back operating position thereof;

said blocking mechanism being constructed and arranged such that said blocking member moves from said inoperative position thereof to said blocking position thereof in response to the forward movement of said seat back cushion assembly into said seat back access position thereof and such that said blocking member is moved from said blocking position thereof to said inoperative position thereof in response to movement of said seat and seat back cushion assemblies together into a seat operating position.

2. A vehicle seat as defined in claim 1 wherein said blocking mechanism includes a blocking member movable between a blocking position preventing said seat back cushion assembly from reaching a seat back operating position as aforesaid and an inoperative position permitting said seat back cushion assembly to reach a seat back operating position, said blocking mechanism being constructed and arranged to move said blocking member from the blocking position thereof into the inoperative position thereof when the seat and seat back cushion assemblies are moved rearwardly together into a seat operating position and the releasable seat locking mechanism is moved into its locked position after such movements have been preceded by the rearward movement of said seat back cushion assembly from said seat back access position toward a seat back operating position.

3. A vehicle seat as defined in claim 2 wherein said blocking mechanism is constructed and arranged to move said blocking member from said inoperative position into said blocking position in response to a rearward movement of said seat back cushion assembly from said seat back access position which precedes the rearward movement of the seat and seat back cushion assemblies together into a seat operating position, the arrangement being such that the blocking member remains in said inoperative position when the rearward movement of said seat back cushion assembly from said seat back access position is subsequent to the rearward movement of said seat and seat back cushion assemblies together into a seat operating position during a cycle of access movement.

4. A vehicle seat as defined in claim 2 wherein the blocking mechanism is constructed and arranged to move said blocking member from said inoperative position into said blocking position in response to the forward movement of said seat back cushion assembly from a seat back operating position into said seat back access position during a cycle of access movement, the arrangement being such that said blocking member is moved from said blocking position into said inoperative position in response to the rearward movement of said seat and seat back cushion assemblies together onto a seat operating position.

5. A vehicle seat as defined in claim 1 wherein said seat mounting assembly includes a seat locking structure constructed and arranged to be moved between locking and releasing positions, a manually engageable structure constructed and arranged to move said seat locking structure between the locking and releasing positions thereof, and a spring system constructed and arranged to effect a resiliently biased return movement of said seat locking structure into the locking position thereof after said manually engageable structure has moved the same from its locking position into its releasing position.

6. A vehicle seat as defined in claim 5 wherein said seat locking structure, said manually engageable structure and said spring system are components of said releasable seat locking mechanism.

7. A vehicle seat as defined in claim 6 wherein said motion transmitting mechanism is connected with said releasable seat locking mechanism by a one-way connection constructed and arranged to enable said releasable seat locking mechanism to be moved into the releasing position thereof against the bias of said spring system by a manual movement of said manually engageable structure without an operative movement of said motion transmitting mechanism taking place.

8. A vehicle seat as defined in claim 7 wherein said motion transmitting mechanism includes a Bowden wire assembly including a cable having one end connected with said releasable seat locking mechanism by said one-way connection.

9. A vehicle seat as defined in claim 8 wherein said seat back mounting assembly includes a pivotal connection constructed and arranged to mount said seat back cushion assembly for pivotal movement about a pivotal axis between a seat back operating position and said seat back access position thereof.

10. A vehicle seat as defined in claim 9 wherein said motion transmitting mechanism includes a connecting link having one end operatively connected to move with said cable and a lost motion connection between an opposite end portion of said connecting link and said seat back cushion assembly at a position thereon spaced below the pivotal axis thereof.

11. A vehicle seat as defined in claim 10 wherein said blocking mechanism includes a blocking member having a forward end pivoted to said seat cushion assembly about an axis disposed in forwardly spaced generally parallel relation to the pivotal axis of said seat back cushion assembly.

12. A vehicle seat as defined in claim 11 wherein said blocking mechanism includes an abutment member fixed to said seat back cushion assembly below the pivotal axis thereof, said blocking member including a rearward end movable generally upwardly into a blocking position of engagement with said abutment member when said blocking mechanism is moved into the blocking position thereof.

13. A vehicle seat as defined in claim 12 wherein said blocking mechanism includes a control member pivotally mounted on said seat cushion assembly about an axis spaced rearward in generally parallel relation to the pivotal axis of said blocking member, said control member being connected to an opposite end of said cable and to said one end of said connecting link so as to be pivoted (1) in one direction by the movement of said connecting link generally in said one direction and (2) in an opposite direction by the movement of said cable generally in said opposite direction.

14. A vehicle seat as defined in claim 13 wherein said blocking mechanism includes an interconnection between said control member and said blocking member constructed and arranged to move said blocking member (1) into the operative blocking position thereof during the pivotal movement of said control member in said one direction and (2) into said inoperative position during the pivotal movement of said control member in said opposite direction.

15. A vehicle seat as defined in claim 14 wherein said interconnection includes a slot in one of said control and blocking members and a pin fixed to another of said control and blocking members, said slot including a moving section constructed and arranged to be engaged by said pin to effect movements of said blocking member by said control member and a locking section constructed and arranged to be engaged by said pin to lock and unlock said blocking member in the operative blocking position thereof by the movement of said control member after having moved said blocking member into said operative blocking position.

16. A vehicle seat as defined in claim 5 wherein said seat locking structure, said manually engageable structure and said spring system are separate from said releasable seat locking mechanism.

17. A vehicle seat as defined in claim 16 wherein said motion transmitting mechanism includes a Bowden wire assembly including a cable having one end connected with said releasable seat locking mechanism.

18. A vehicle seat as defined in claim 17 wherein said releasable seat locking mechanism includes a seat locking structure spring biased into a locking position and movable therefrom against the spring bias into a releasing position, said Bowden wire assembly and said releasable seat locking mechanism being constructed and arranged so that movement of said Bowden wire one end in one direction moves said seat locking structure from the locking position thereof to the releasing position thereof.

19. A vehicle seat as defined in claim 18 wherein said releasable seat locking mechanism includes a releasable latching structure constructed and arranged (1) to be spring biased into a latching position to retain said seat locking structure in the releasing position thereof against the spring bias thereof during the movement of said seat and seat back cushion assemblies together forwardly away from and rearwardly toward a seat operating position during a cycle of access movement and (2) to be moved from said latching position against the spring bias thereof in response to the forward movement of said seat and seat back cushion assemblies together back into a seat operating position during a cycle of access movement into a releasing position enabling said seat locking structure to be spring biased into said locking position.

20. A vehicle seat as defined in claim 19 wherein said seat back mounting assembly includes a pivotal connection constructed and arranged to mount said seat back cushion assembly for pivotal movement about a pivotal axis between a seat back operating position and said seat back access position.

21. A vehicle seat as defined in claim 20 wherein said cable includes an opposite end connected with said seat back cushion assembly at a position thereon spaced below the pivotal axis thereof so that the movement of said seat back cushion assembly from a seat back operating position into said seat back access position causes said cable to be tensioned and said one end to move in said one direction.

22. A vehicle seat as defined in claim 21 wherein said blocking mechanism includes a spring system constructed and arranged with respect to said blocking member to resiliently bias the blocking member into said blocking position, said blocking member being connected with the opposite end portion of said cable, the connection of the ends of said cable as aforesaid establishing sufficient tension in said cable to (1) retain said blocking member in said inoperative position against the bias of said spring system when said seat cushion assembly is in a seat operating position and said seat back cushion assembly is in a seat back operating position (2) retain said blocking member in said inoperative position against the resilient bias of said spring system during the forward movement of said seat back cushion assembly into the seat back access position thereof in a cycle of access movement and (3) retain said blocking member in said inoperative position against the resilient bias of said spring system during the rearward movement of said seat back cushion assembly from said seat back access position into a seat back operating position after said seat and seat back cushion assemblies have been moved rearwardly into a seat operating position in a cycle of access movement, the connection of the ends of said cable establishing sufficient slack in said cable to allow said spring system to move the blocking member from said inoperative position into said blocking position in response to the rearward movement of said seat back cushion assembly away from said seat back access position in a cycle of access movement when said seat locking structure is latched into the releasing position thereof by said latching structure.

23. A vehicle seat comprising:
   a seat cushion assembly constructed and arranged to support a vehicle occupant seated thereon,
   a seat back cushion assembly constructed and arranged to support the back of a vehicle occupant,
   a seat mounting assembly constructed and arranged to mount said seat cushion assembly on a vehicle floor for forward and rearward movements,
   said seat mounting assembly including a releasable seat locking mechanism constructed and arranged to be moved between a locking position locking said seat mounting assembly to fixedly retain said seat cushion assembly in a seat operating position and a releasing position releasing said seat mounting assembly to allow forward movement of said seat cushion assembly from a seat operating position into a seat access position and rearward movement of said seat cushion assembly from said seat access position into a seat operating position,
   said seat mounting assembly including a seat locking structure constructed and arranged to be moved between locking and releasing positions, a manually engageable structure constructed and arranged to move said seat locking structure between the locking and releasing positions thereof, and a spring system constructed and arranged to effect a resiliently biased return movement of said seat locking structure into the locking position thereof after said manually engageable structure has moved the same from its locking position into its releasing position, said seat locking structure, said manually engageable structure, and said spring system being separate from said releasable seat locking mechanism,
   a seat back mounting assembly disposed between said seat and seat back cushion assemblies, said seat back mounting assembly being constructed and arranged to mount said seat back cushion assembly on said seat cushion assembly for forward and rearward movements together and for movement of the seat back cushion assembly relative to said seat cushion assembly (1) forwardly from a seat back operating position suitable to support the back of a vehicle occupant seated on said seat cushion assembly into a seat back access position overlying the seat cushion assembly and (2) rearwardly from said seat back access position into a seat back operating position,
   said seat back mounting assembly including a releasable seat back locking mechanism operatively associated with said seat back mounting assembly, said releasable seat back locking mechanism being constructed and arranged to be capable of manually controlled movements between a locking position locking said seat back mounting assembly to prevent forward movement of said seat back cushion assembly from a seat back operating position into said seat back access position and a releasing position releasing said seat back mounting assembly to allow forward movement of said seat back cushion assembly into said seat back access position and rearward movement therefrom into a seat back operating position,
   a motion transmitting mechanism is operatively associated with said releasable seat locking mechanism, said motion transmitting mechanism being constructed and arranged to transmit a forward movement of said seat back cushion assembly from a seat back operating position to a movement of said releasable seat locking mechanism from the locking position thereof into the releasing position thereof so as to permit a cycle of access movement which includes (1) the aforesaid forward movement of said seat back cushion assembly into said seat back access position and forward movement of said seat and seat back cushion assemblies together from a seat operating position into said seat access position and (2) rearward movements of said seat and seat back assemblies together from said seat access position into a seat operating position and said seat back cushion assembly into a seat back operating position, said motion transmitting mechanism and said releasable seat locking mechanism being constructed and arranged such that said releasable seat locking mechanism moves into its locking position when said seat and seat back cushion assemblies are moved rearwardly together into a seat operating position during said cycle of access movement, and a blocking mechanism operatively associated with said motion transmitting mechanism, said blocking mechanism being constructed and arranged to be operable during a cycle of access movement to prevent said seat back cushion assembly from reaching a seat back operating position during the rearward movement of said seat back cushion assembly from said seat back access position in the event the aforesaid rearward movement of said seat back cushion assembly precedes the rearward movement of the seat and seat back cushion assemblies together into a seat operating position.

24. A vehicle seat as defined in claim 23 wherein said motion transmitting mechanism includes a Bowden wire assembly including a cable having one end connected with said releasable seat locking mechanism.

25. A vehicle seat as defined in claim 24 wherein said releasable seat locking mechanism includes a seat locking structure spring biased into a locking position and movable therefrom against the spring bias into a releasing position, said Bowden wire assembly and said releasable seat locking mechanism being constructed and arranged so that movement of said Bowden wire one end in one direction moves said seat locking structure from the locking position thereof to the releasing position thereof.

26. A vehicle seat as defined in claim 25 wherein said releasable seat locking mechanism includes a releasable latching structure constructed and arranged (1) to be spring biased into a latching position to retain said seat locking structure in the releasing position thereof against the spring bias thereof during the movement of said seat and seat back cushion assemblies together forwardly away from and rearwardly toward a seat operating position during a cycle of access movement and (2) to be moved from said latching position against the spring bias thereof in response to the forward movement of said seat and seat back cushion assemblies together back into a seat operating position during a cycle of access movement into a releasing position enabling said seat locking structure to be spring biased into said locking position.

27. A vehicle seat as defined in claim 26 wherein said seat back mounting assembly includes a pivotal connection constructed and arranged to mount said seat back cushion assembly for pivotal movement about a pivotal axis between a seat back operating position and said seat back access position.

28. A vehicle seat as defined in claim 27 wherein said cable includes an opposite end connected with said seat back cushion assembly at a position thereon spaced below the pivotal axis thereof so that the movement of said seat back cushion assembly from a seat back operating position into said seat back access position causes said cable to be tensioned and said one end to move in said one direction.

29. A vehicle seat as defined in claim 28 wherein said blocking mechanism includes a spring system constructed and arranged with respect to said blocking member to resiliently bias the blocking member into said blocking position, said blocking member being connected with the opposite end portion of said cable, the connection of the ends of said cable as aforesaid establishing sufficient tension in said cable to (1) retain said blocking member in said inoperative position against the bias of said spring system when said seat cushion assembly is in a seat operating position and said seat back cushion assembly is in a seat back operating position (2) retain said blocking member in said inoperative position against the resilient bias of said spring system during the forward movement of said seat back cushion assembly into the seat back access position thereof in a cycle of access movement and (3) retain said blocking member in said inoperative position against the resilient bias of said spring system during the rearward movement of said seat back cushion assembly from said seat back access position into a seat back operating position after said seat and seat back cushion assemblies have been moved rearwardly into a seat operating position in a cycle of access movement, the connection of the ends of said cable establishing sufficient slack in said cable to allow said spring system to move the blocking member from said inoperative position into said blocking position in response to the rearward movement of said seat back cushion assembly away from said seat back access position in a cycle of access movement when said seat locking structure is latched into the releasing position thereof by said latching structure.

* * * * *